United States Patent
Sano et al.

(10) Patent No.: US 8,269,878 B2
(45) Date of Patent: Sep. 18, 2012

(54) IMAGE PICKUP LENS, IMAGE PICKUP APPARATUS AND MOBILE TERMINAL

(75) Inventors: Eigo Sano, Hino (JP); Yuichi Ozaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/183,279

(22) Filed: Jul. 14, 2011

(65) Prior Publication Data
US 2012/0021802 A1    Jan. 26, 2012

Related U.S. Application Data

(63) Continuation of application No. 13/059,501, filed as application No. PCT/JP2009/064634 on Aug. 21, 2009, now Pat. No. 8,035,723.

(30) Foreign Application Priority Data

Aug. 25, 2008   (JP) ................. 2008-215162
Feb. 26, 2009   (JP) ................. 2009-043786

(51) Int. Cl.
*H04N 5/225*     (2006.01)
*G02B 13/18*     (2006.01)
(52) U.S. Cl. ......... 348/340; 348/335; 348/360; 359/714
(58) Field of Classification Search .......... 348/335, 348/340, 360; 359/708, 714
See application file for complete search history.

(56) References Cited

U.S. PATENT DOCUMENTS

| | | | |
|---|---|---|---|
| 5,825,556 A | 10/1998 | Meyers | |
| 6,236,522 B1 | 5/2001 | Shimizu | |
| 7,466,497 B2 | 12/2008 | Park et al. | |
| 7,864,454 B1 | 1/2011 | Tang et al. | |
| 7,925,387 B2 | 4/2011 | Zheng et al. | |
| 8,035,723 B2 * | 10/2011 | Sano et al. | 348/335 |
| 2007/0070234 A1 | 3/2007 | Sun | |
| 2008/0212203 A1 | 9/2008 | Taguchi et al. | |

(Continued)

FOREIGN PATENT DOCUMENTS

JP    7-120671    5/1995

(Continued)

OTHER PUBLICATIONS

Written Opinion issued in corresponding application PCT/JP2009/064634.

(Continued)

*Primary Examiner* — David N Spector
(74) *Attorney, Agent, or Firm* — Cozen O'Connor

(57) ABSTRACT

Provided is a small-sized five-element image pickup lens which ensures a sufficient lens speed of about F2 and exhibits various aberrations being excellently corrected. The image pickup lens is composed of, in order from the object side, a first lens with a positive refractive power, including a convex surface facing the object side; a second lens with a negative refractive power, including a concave surface facing the image side; a third lens with a positive or negative refractive power; a fourth lens with a positive refractive power, including a convex surface facing the image side; and a fifth lens with a negative refractive power, including a concave surface facing the image side. The image-side surface of the fifth lens has an aspheric shape, and includes an inflection point at a position excluding an intersection point with the optical axis.

12 Claims, 28 Drawing Sheets

U.S. PATENT DOCUMENTS

| | | | |
|---|---|---|---|
| 2010/0188555 A1 | 7/2010 | Hirao et al. | |
| 2010/0220229 A1* | 9/2010 | Sano | 348/340 |
| 2011/0188131 A1* | 8/2011 | Sano | 359/714 |
| 2011/0249346 A1* | 10/2011 | Tang et al. | 359/764 |
| 2012/0019705 A1* | 1/2012 | Sano et al. | 348/340 |
| 2012/0026369 A1* | 2/2012 | Sano et al. | 348/294 |
| 2012/0026388 A1* | 2/2012 | Sano et al. | 348/360 |

FOREIGN PATENT DOCUMENTS

| | | |
|---|---|---|
| JP | 11-133315 | 5/1999 |
| JP | 11-167061 | 6/1999 |
| JP | 11-183796 | 7/1999 |
| JP | 2002-82282 | 3/2002 |
| JP | 2006-293042 | 10/2006 |
| JP | 2007-017984 | 1/2007 |
| JP | 2007-279282 | 10/2007 |
| JP | 2007-298572 | 11/2007 |
| JP | 2007-322844 | 12/2007 |
| JP | 2009-147675 | 7/2009 |
| TW | M313246 | 6/2007 |

OTHER PUBLICATIONS

English Translation of Written Opinion issued in corresponding application PCT/JP2009/064634.

Notice of Allowance issued Feb. 7, 2012 in Japanese Application No. 2011-144933.

* cited by examiner

MERIDIONAL COMA (mm)

MERIDIONAL COMA (mm)

MERIDIONAL COMA (mm)

MERIDIONAL COMA (mm)

MERIDIONAL COMA (mm)

MERIDIONAL COMA (mm)

MERIDIONAL COMA (mm)

MERIDIONAL COMA (mm)

MERIDIONAL COMA (mm)

MERIDIONAL COMA (mm)

IMAGE PICKUP LENS, IMAGE PICKUP APPARATUS AND MOBILE TERMINAL

CROSS REFERENCE TO RELATED APPLICATIONS

This application is a continuation of U.S. patent application Ser. No. 13/059,501 which was filed with the U.S. Patent and Trademark Office on Feb. 17, 2011 now U.S. Pat. No. 8,035,723 and which is a U.S. National Phase application of International Application PCT/JP2009/064634 filed Aug. 21, 2009. Foreign priority is claimed for this invention and application, corresponding application(s) having been filed in Japan on Aug. 25, 2008, No. 2008-215162, Japan on Feb. 26, 2009, No. 2009-043786.

TECHNICAL FIELD

The present invention relates to a small-sized image pickup lens with excellent lens speed, used for a solid-state image pickup element such as a CCD type image sensor or a CMOS type image sensor, and to an image pickup apparatus equipped with the image pickup lens, and a mobile terminal equipped with the image pickup apparatus.

BACKGROUND ART

Recently, a mobile terminal on which an image pickup apparatus employing a solid-state image pickup element such as a CCD type image sensor or a CMOS type image sensor is mounted are coming into wide use. As for an image pickup apparatus to be mounted on such a mobile terminal, those employing an image pickup element with a large number of pixels have been supplied into the market in order to obtain images with higher image quality. Image pickup elements with a larger number of pixels were large in size. However, corresponding to the recent progress of pixels in terms of minuteness, image pickup elements have been becoming small-sized recently.

An image pickup lens used for such the image pickup elements with minuteness is required to have high resolving power. However, the resolving power is limited depending on F-number, and it is becoming difficult to give sufficient performance with a conventional art with F-number of about F2.8. Therefore, image pickup lenses with excellent lens speed of about F2, suitable for a small-sized image pickup lens with a large number of pixels has been required, because a lens with smaller F-number and more excellent lens speed exhibits higher resolving power. As an image pickup lens for such the use, there has been proposed a five-element image pickup lens that can make the aperture diameter larger and make its performance higher than a lens having a three-or-four-element structure.

As a five-element image pickup lens, there has been known an image pickup lens composed of, in order from the object side, the front group composed of the first lens with positive or negative refractive power and the second lens with positive refractive power, an opening aperture, and a rear group composed of a third lens with negative refractive power, a fourth lens with positive refractive power, and a fifth lens with positive or negative refractive power (For example, see Patent Literature 1 and Patent Literature 2).

Further, there has been known a four-element image pickup apparatus with lens speed of about F2 (For example, Patent Literature 3).

CITATION LIST

Patent Literature

Patent Literature 1: JP-A No. 2007-279282
Patent Literature 2: JP-A No. 2006-293042
Patent Literature 3: JP-A No. 2007-322844

SUMMARY OF INVENTION

Technical Problem

However, in the image pickup lens written in the above Patent Literature 1, a front group is composed of spherical systems. When the lens has a small light speed of about F2, correction of spherical aberration and coma is insufficient and excellent performance is hardly maintained. Further, because it has a structure that both of the front group and the rear group have positive refractive power, a position of the principal point of the optical system is located at a closer position to the image and the back focal length becomes longer, compared with the structure such as a telephoto type in which the rear group has negative refractive power. Therefore, the total length of the image pickup lens (the length along the optical axis from the first surface at the closest position to the object side to the image plane) is elongated, which is a problem.

Further, the image pickup lens described in the above-described Patent Literature 2, has a lens speed of about F2. However, it has a structure that the both of the first lens and the second lens have positive refractive power, and chromatic aberration correction is insufficient in the front group. Further, because it has a structure that the both of the front group and the rear group has positive refractive power similarly to Patent Literature 1, and the rearmost lens is a positive lens, the total length of the image pickup lens is elongated, which is a problem.

Furthermore, the image pickup lens described in Patent Literature 3 has a lens speed of about F2. However, aberration correction is insufficient because it is a four-element structure, and it is hard to say that it is suitable for an image pickup lens coping with an increase of the pixel numbers.

The present invention is achieved in view of the above problems, and is aimed to obtain a small-sized five-element image pickup lens which has sufficient lens speed of about F2 and exhibits excellently-corrected various aberrations, and to provide an image pickup apparatus by which preferable photographed images with high image quality can be obtained by the image pickup lens provided therein, and a mobile terminal equipped with the image pickup apparatus.

As for a dimension of a small-sized image pickup lens, the present invention is aimed to achieve downsizing at the level satisfying the following expression (10). Satisfying the range allows to downsize and lighten the whole image pickup apparatus.

$$L/2Y<1.1 \tag{10}$$

In the expression, L represents a distance along the optical axis from the lens surface arranged at the closest position to the object side in the total system of the image pickup lens to the focal point at the image side, and 2Y represents a diagonal length of an image pickup surface of a solid-state image pickup element (a diagonal length of a rectangular effective pixel area of the solid-state image pickup element).

In the above description, "focal point at the image side" means an image point formed when a parallel ray which is parallel with the optical axis enters a lens.

When there is arranged a parallel flat plate such as an optical low-pass filter, an infrared blocking filter and a sealing glass of a solid-state image pickup element package, at a position between the lens surface arranged at the closest position to the image side in the image pickup lens and the focal point at the image side, the value of L is calculated on the assumption that a space of the parallel flat plate is regarded as an air-equivalent distance.

Solution to Problem

The above object will be achieved by the invention which will be described below.

An image pickup lens described in claim 1 is an image pickup lens for forming an image of a subject onto a photoelectric conversion section of a solid-state image pickup element. The image pickup lens is characterized by comprising, in order from an object side thereof: a first lens with a positive refractive power, comprising a convex surface facing the object side; a second lens with a negative refractive power, comprising a concave surface facing an image side; a third lens with a positive or negative refractive power; a fourth lens with a positive refractive power, comprising a convex surface facing the image side; and a fifth lens with a negative refractive power, comprising a concave surface facing the image side, wherein an image-side surface of the fifth lens has an aspheric shape, and includes an inflection point at a position excluding an intersection point with an optical axis.

According to the invention described in claim 1, by forming two or three lenses in the five-element structure into negative lenses, the number of surfaces having divergent function is increased to make correction of Petzval sum easy, which allows to obtain an image pickup lens maintaining an excellent image-forming function up to the peripheral portion of an image area.

Further, by forming the image-side surface of the fifth lens arranged at the closest position to the image side into an aspheric surface, various aberrations can be corrected in an excellent condition at the peripheral portion of the image area. Further, by forming the surface into an aspheric shape including an inflection point at a position thereon except the intersection with the optical axis, telecentricity of a light flux at the image side can be easily secured.

Further, by forming positive composite power with the first to fourth lenses, and forming negative power with the fifth lens, there can be provided so-called a telephoto-type lens construction which is advantageous to downsize the total length of the image pickup lens.

In the present specification, "an inflection point" is a point on an aspheric surface at which a tangential plane at a peak of the aspheric surface is perpendicular to the optical axis, in a curve of sectional shape of the lens within an effective radius.

The image pickup lens described in claim 2 is an image pickup lens according to the invention described in claim 1, characterized by satisfying the following conditional expression.

$$0.9 < f12/f < 2.0 \quad (1)$$

In the expression, f12 is a composite focal length of the first lens and the second lens, and f is a focal length of a total system of the image pickup lens.

The conditional expression (1) is a conditional expression for defining the composite focal length of the first lens and the second lens properly.

When the value of the conditional expression (1) becomes lower than the upper limit, the positive composite focal length of the first lens and the second lens can be properly maintained. Thereby, the principal point of the entire system can be placed at a closer position to the object side, and the total length of the image pickup lens can be shortened. On the other hand, when the value becomes larger than the lower limit, the positive composite focal length of the first lens and the second lens does not become excessively small. Thereby, higher-order spherical aberrations and coma can be controlled to be small, and fluctuation of an image plane corresponding to manufacturing error can be reduced.

The image pickup lens described in claim 3 is an image pickup lens according to the invention described in claim 1 or 2, characterized by satisfying the following conditional expressions.

$$-2.5 < f2/f < -1.0 \quad (2)$$

$$0.3 < r4/f < 0.7 \quad (3)$$

In the expressions, f2 is a focal length of the second lens, r4 is a curvature radius of an image-side surface of the second lens, and f is a focal length of a total system of the image pickup lens.

The conditional expression (2) is a conditional expression for determining the focal length of the second lens properly. When the value of the conditional expression (2) becomes lower than the upper limit, the negative refractive power of the second lens does not excessively strong, and coma and distortion can be reduced in the peripheral portion. On the other hand, when the value becomes larger than the lower limit, the negative refractive power of the second lens can be maintained properly, which is effective for reducing Petzval sum and correcting field curvature.

Further, it is more preferable that the following conditional expression is satisfied.

$$-2.4 < f2/f < -1.0 \quad (2)'$$

Further, the conditional expression (3) is a conditional expression for determining the curvature radius of the image-side surface of the second lens properly. When the value of the conditional expression (3) becomes lower than the upper limit, the position of the principal point of the second lens moves at a closer position to the image side, which allows reduction of Petzval sum and correction of field curvature, without making the focal length of the second lens excessively greater. On the other hand, when the value becomes larger than the lower limit, an incident angle of a ray at the periphery of the image-side surface of the second lens becomes small, and generation of coma can be controlled.

Further, it is more preferable that the following conditional expression is satisfied.

$$0.35 < r4/f < 0.65 \quad (3)'$$

The image pickup lens described in claim 4 is an image pickup lens according to the invention described in any one of claims 1 to 3, characterized by satisfying the following conditional expression.

$$20 < v1 - v2 < 70 \quad (4)$$

In the expression, v1 is an Abbe number of the first lens, and v2 is an Abbe number of the second lens.

The conditional expression (4) is a conditional expression for correcting chromatic aberrations of the total system of the image pickup lens properly. When the value of the conditional expression (4) becomes larger than the lower limit, chromatic aberrations such as a longitudinal chromatic aberration and a chromatic aberration of magnification can be corrected in a balanced condition. On the other hand, when the value becomes lower than the upper limit, the image pickup lens can be formed of materials which are easily available.

Further, it is more preferable that the following conditional expression is satisfied.

$$25 < v1-v2 < 65 \quad (4)'$$

The image pickup lens described in claim 5 is an image pickup lens according to the invention described in any one of claims 1 to 4, characterized by satisfying the following conditional expression.

$$1.60 < n2 < 2.10 \quad (5)$$

In the expression, n2 is a refractive index of the second lens for d-line.

The conditional expression (5) is a conditional expression for correcting chromatic aberrations and field curvature of the total system of the image pickup lens properly. When the value of the conditional expression (5) becomes larger than the lower limit, refractive power of the second lens which has a relatively large dispersion can be maintained properly, and chromatic aberrations and field curvature can be corrected properly. On the other hand, when the value becomes lower than the upper limit, the image pickup lens can be formed of materials which are easily available.

Further, it is more preferable that the following conditional expression is satisfied.

$$1.60 < n2 < 2.00 \quad (5)'$$

The image pickup lens described in claim 6 is an image pickup lens according to the invention described in any one of claims 1 to 5, characterized by satisfying the following conditional expression.

$$-2.35 < Pair23/P < -0.75 \quad (6)$$

In the expression, P is a refractive power of the total system of the image pickup lens, and Pair23 is a refractive power of so-called an air lens formed by an image-side surface (r4) of the second lens and an object-side surface of the third lens (r5), wherein the refractive power is a reciprocal of a focal length and the value of Pair23 is calculated by the following expression (7).

$$Pair23 = \{(1-n2)/r4\} + \{(n3-1)/r5\} - \{(1-n2)\cdot(n3-1)\cdot d23/(r4\cdot r5)\} \quad (7)$$

In the expression, n2 is a refractive index of the second lens for d-line, n3 is a refractive index of the third lens for d-line, r4 is a curvature radius of the image-side surface of the second lens, r5 is a curvature radius of the object-side surface of the third lens, and d23 is an air distance along the optical axis between the second lens and the third lens.

The conditional expression (6) is a conditional expression for determining the refractive power of the air lens formed by the image-side surface of the second lens and the object-side surface of the third lens properly. Because the value of the conditional expression (6) becomes lower than the upper limit, a negative refractive power of the air lens can be maintained properly. Thereby, Petzval sum does not excessively large and an image plane can be made flat, and chromatic aberrations can be corrected in an excellent condition. On the other hand, when the value becomes larger than the lower limit, the negative refractive power of the air lens does not become excessively strong. Thereby, the curvature radiuses of the image-side surface of the second lens and the object-side surface of the third lens can be made large, which enhances productivity of the lenses. Further, because the image-side surface of the second lens and the object-side of the third lens are positioned to be separated away from each other in the off-axis portion, which enables to secure space where a light-sealing member for preventing unnecessary light such as ghost is inserted between the second lens and the third lens, without enlarging the distance along the optical axis between those lenses.

Further, it is more preferable that the following conditional expression is satisfied.

$$-2.25 < Pair23/P < -0.85 \quad (6)'$$

The image pickup lens described in claim 7 is an image pickup lens according to the invention described in any one of claims 1 to 6, characterized by satisfying the following conditional expressions.

$$1.5 < |f3|/f < 20.0 \quad (8)$$

$$0.2 < d456/f < 0.4 \quad (9)$$

In the expressions, f3 is a focal length of the third lens, d456 is a distance along the optical axis between an image-side surface of the second lens and an object-side surface of the fourth lens, and f is a focal length of a total system of the image pickup lens.

The conditional expression (8) is a conditional expression for determining the focal length of the third lens properly. The third lens corresponds to a lens with a small refractive power for correcting the image plane, arranged at a position between a second lens and a third lens in a conventional four-element structure lens. When the value of the conditional expression (8) becomes lower than the upper limit, the image plane can be corrected more effectively than the four-element structure lens. On the other hand, when the value becomes larger than the lower limit, a variation of a focal length of the total system caused by an increase of the refractive power of the third lens can be controlled.

Further, the conditional expression (9) is a conditional expression for determining the distance between the second lens and the fourth lens properly. When the value of the conditional expression (9) becomes larger than the lower limit, a proper distance for positioning the third lens for correcting the image plane can be maintained. On the other hand, when the value becomes lower than the upper limit, an increase of the total length caused by an increase of the distance between the second lens with negative refractive power and the fourth lens with positive refractive power can be controlled.

The image pickup lens described in claim 8 is an image pickup lens according to the invention described in any one of claims 1 to 7, characterized in that an object-side surface of the third lens is formed in an aspheric shape which curves to be closer to the second lens at a position on the surface, as the position advances toward a peripheral portion.

By forming the object-side surface of the third lens in an aspheric shape which curves to be closer to the second lens at a closer position to a peripheral portion, the second lens and the third lens forms a symmetric shape across an air gap, which corrects coma caused in the second lens and the third lens in an excellent condition. Further, it forms a structure which easily corrects a chromatic aberration of magnification and distortion of the total system of the image pickup lens.

The image pickup lens described in claim 9 is an image pickup lens according to the invention described in any one of claims 1 to 8, characterized in that an image-side surface of the second lens is formed in an aspheric shape having negative refractive power which becomes smaller at a position on the surface, as the position becomes more distant from an optical axis toward a peripheral portion.

By forming the image-side surface of the second lens in an aspheric shape having negative refractive power which becomes smaller at a position being more distant from the optical axis toward the peripheral portion, a ray does not excessively deflect in the peripheral portion and excellent telecentricity can be maintained in the peripheral portion.

The image pickup lens described in claim 10 is an image pickup lens according to the invention described in any one of claims 1 to 9, characterized in that an image-side surface of the fourth lens is formed in an aspheric shape having positive refractive power which becomes smaller at a position on the surface, as the position becomes more distant from an optical axis toward a peripheral portion.

By forming the image-side surface of the fourth lens in an aspheric shape having positive refractive power which becomes smaller at a position being more distant from an optical axis toward a peripheral portion, excellent telecentricity can be maintained in the peripheral portion. Further, the image-side surface of the second lens is not required to have excessively weak negative refractive power, and off-axis aberrations can be corrected in an excellent condition.

The image pickup lens descried in claim 11 is an image pickup lens according to the invention described in any one of claims 1 to 10, characterized by further comprising an aperture stop which is arranged at a position being closer to the image side than a position on the optical axis of an object-side surface of the first lens and being closer to the object side than a position in a most peripheral portion of the object-side surface of the first lens.

When the aperture stop is positioned at a position which is rear from the position on the optical axis on the object-side surface of the first lens and is front of the peripheral portion of the surface, a refraction angle at the object-side surface of the first lens can be reduced. Therefore, generation of the higher-order spherical aberrations and coma caused in the first lens can be controlled. Further, the height of a ray passing through the first lens can be lowered, thereby, the edge thickness of the first lens is easily secured and moldability can be enhanced.

The image pickup lens descried in claim 12 is an image pickup lens according to the invention described in any one of claims 1 to 11, characterized in that each of the first through fifth lenses is formed of a plastic material.

In recent years, under the purpose of downsizing of an overall solid-state image pickup apparatus, there has been developed a solid-state image pickup element with a smaller pixel pitch, resulting in downsizing of an image pickup surface, compared with another solid-state image pickup element having the same number of pixels. In the image pickup lens for the solid-state image pickup element having a small-sized image pickup surface of this kind, a focal length of the total optical system is requested to be relatively short, which makes a curvature radius and the outside diameter of each lens to be considerably small. Therefore, when compared with a glass lens manufactured through time-consuming grinding processing, image pickup lenses in which all lenses are plastic lenses manufactured by injection molding can be mass-produced at low cost even if each lens has a small curvature radius and a small outside diameter. In addition, it is possible to control wear and tear of a molding die because press temperature can be made low in the case of a plastic lens, and a frequency of replacement of molding dies and a frequency of maintenance can be reduced, which realizes cost reduction.

An image pickup apparatus described in claim 13 is characterized by comprising: a solid-state image pickup element for photo-electrically converting an image of a subject; and the image pickup lens described in any one of claims 1 to 12. Thereby, there can be obtained an image pickup apparatus by which excellent shots with high image quality can be obtained.

A mobile terminal described in claim 14 is characterized by comprising the image pickup apparatus described in claim 13. Thereby, there can be obtained a mobile terminal equipped with an image pickup apparatus by which excellent shots with high image quality can be obtained.

Advantageous Effects of Invention

According to the present invention, there can be provided a small-sized five-element image pickup lens which ensures a sufficient lens speed of about F2 and exhibits various aberrations being excellently corrected, and an image pickup apparatus and mobile terminal by which excellent shots with high image quality can be obtained.

DESCRIPTION OF EMBODIMENTS

The present invention will be described below by using embodiments. However, the scope of the invention is not limited to them.

Figure 1:
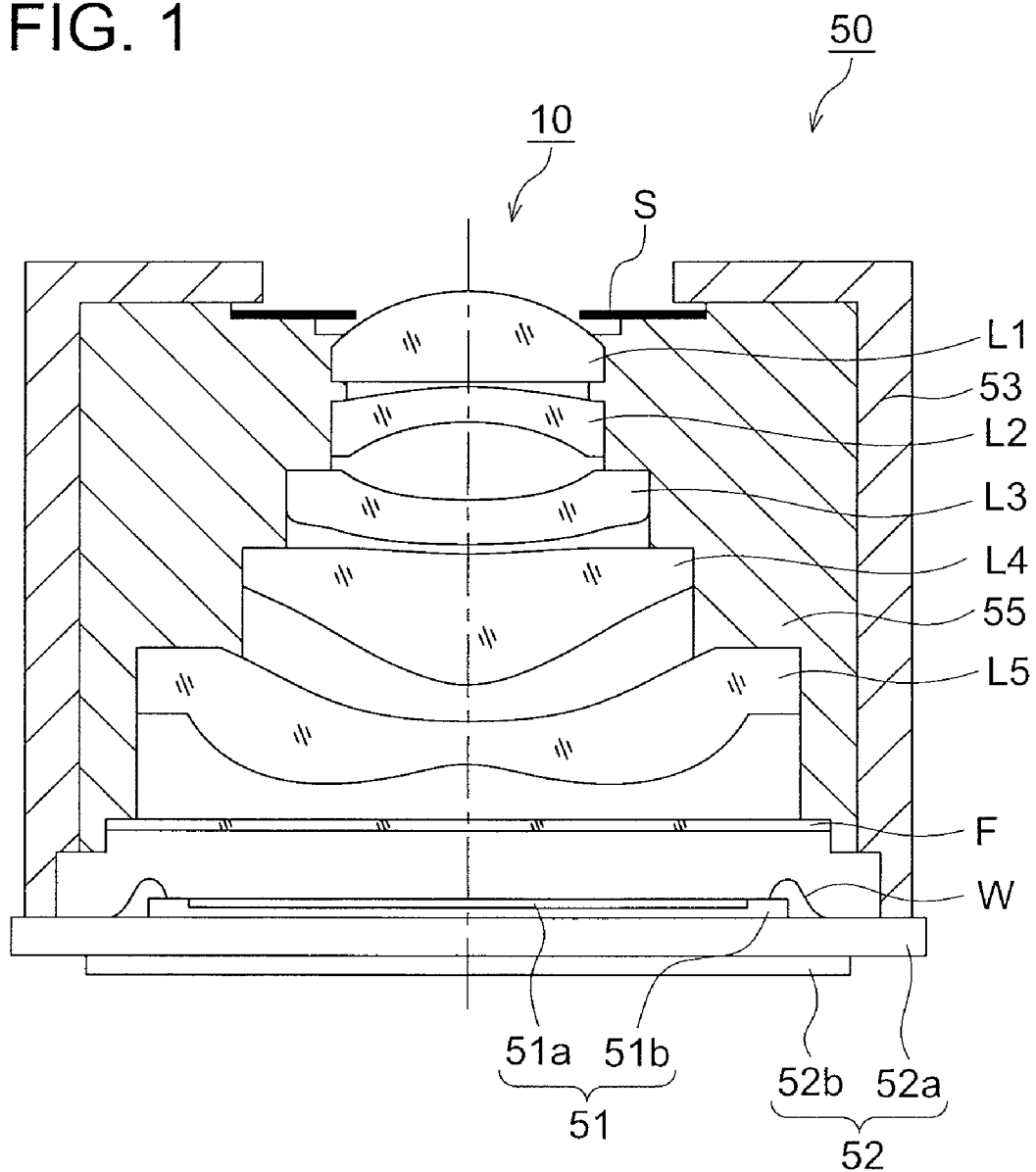
FIG. 1 shows a perspective view illustrating an example of an image pickup apparatus relating to the present embodiment.

FIG. 1 is a cross-sectional view of an example of image pickup apparatus 50 relating to the present embodiment. This figure schematically illustrates the cross-section taken along the optical axis of the image pickup lens.

As shown in the figure, image pickup apparatus 50 includes CMOS type image pickup element 51 as the solid-state image pickup element having photoelectric conversion section 51a; image pickup lens 10 for forming a subject image onto photoelectric conversion section 51a of the image pickup element 51; casing 53 as a lens barrel formed of a light shielding member having an aperture section for the incident light from the object side; supporting substrate 52a supporting image pickup element 51; and flexible print substrate 52b having an external connecting terminal 54 for sending and receiving electric signal. They are integrally formed in one body.

Image pickup element 51 includes photoelectric conversion section 51a representing a light-receiving section, on the central portion of a surface on the light-receiving side of the image pickup element 51, and includes signal processing circuit 51b formed to surround the photoelectric conversion section. On the photoelectric conversion section 51a, pixels (photoelectric conversion elements) are arranged on a two-dimensional basis. The signal processing circuit 51b is composed of a drive circuit that obtains signal electric charges by driving respective pixels in succession, A/D converting section that converts each signal electric charge into digital signal and of a signal processing section that forms an output of image signal by using the digital signal.

Around the outer edge of the light-receiving-side surface of image pickup element 51, many pads which are not illustrated are provided and connected with support substrate 52a through bonding wires W. The image pickup element 51 converts the signal charge from the photoelectric conversion section 51a into image signal such as digital YUV signal, and outputs it to a predetermined circuit on the support substrate 52a through bonding wires W. Y represents luminance signal, U (=R−Y) represents color difference signal between red and the luminance signal, and V (=B−Y) represents color difference signal between blue and the luminance signal.

Hereupon, the image pickup element is not limited to the above-described CMOS type image sensor, but another element such as a CCD can be employed.

Substrate 52 is structured by hard support substrate 52a supporting image pickup element 51 and casing 53 on its one surface, and by flexible print substrate 52b whose one end is connected to the other surface (the opposite surface from image pickup element 51) of the support substrate 52a. On the support substrate 52a, many signal transmission pads are provided on the both of the front and rear surfaces. They are connected to image pickup element 51 through bonding wires W on the one surface, and are connected to the flexible print substrate 52b on the other surface.

The flexible print substrate 52b connects support substrate 52a to an unillustrated external circuit (for example, a control circuit provided by the higher level of apparatus on which the image pickup apparatus is mounted), which enables to receive voltage and clock signal for driving image pickup element 51 from the external circuit and to output the digital YUV signal to the external circuit.

Casing 53 is fixedly arranged on a surface of support substrate 52a which is a surface facing the image pickup element 51 so as to cover the image pickup element 51. That is, one side of the casing 53 facing the image pickup element 51 has a widely opened shape so as to surround the image pickup element 51 and is contacted and fixed to the support substrate 52a. The other side of the casing 53 is formed in a cylindrical shape having a flange with a small opening.

Inside casing 53, a parallel flat plate F having an infrared blocking function is fixedly arranged at a position between the image pickup lens 10 and the image pickup element 51.

There are provided aperture stop S, first lens L1, second lens L2, third lens L3, fourth lens L4 and fifth lens L5, which are structured in such a manner that a subject image is formed on photoelectric conversion surface 51a of image pickup element 51. Further, a one-dotted chain line represents the optical axis which is common in respective lenses L1-L5.

Lenses L1-L5 forming image pickup lens 10 are held by lens frame 55. Casing 53 houses this lens frame 55 and the image pickup lens 10 held by the lens frame 55. The lens frame 55 is engaged with the casing 53 at its outer periphery, and is contacted with the flange section having a small opening of the casing 53 to be positioned.

Further, although it is not illustrated, a fixed stop to cut unnecessary light may be arranged in a space between lenses L1-L5. Generation of ghost and flare light can be suppressed when a rectangular fixed stop is arranged outside a path of a ray.

Figure 2:
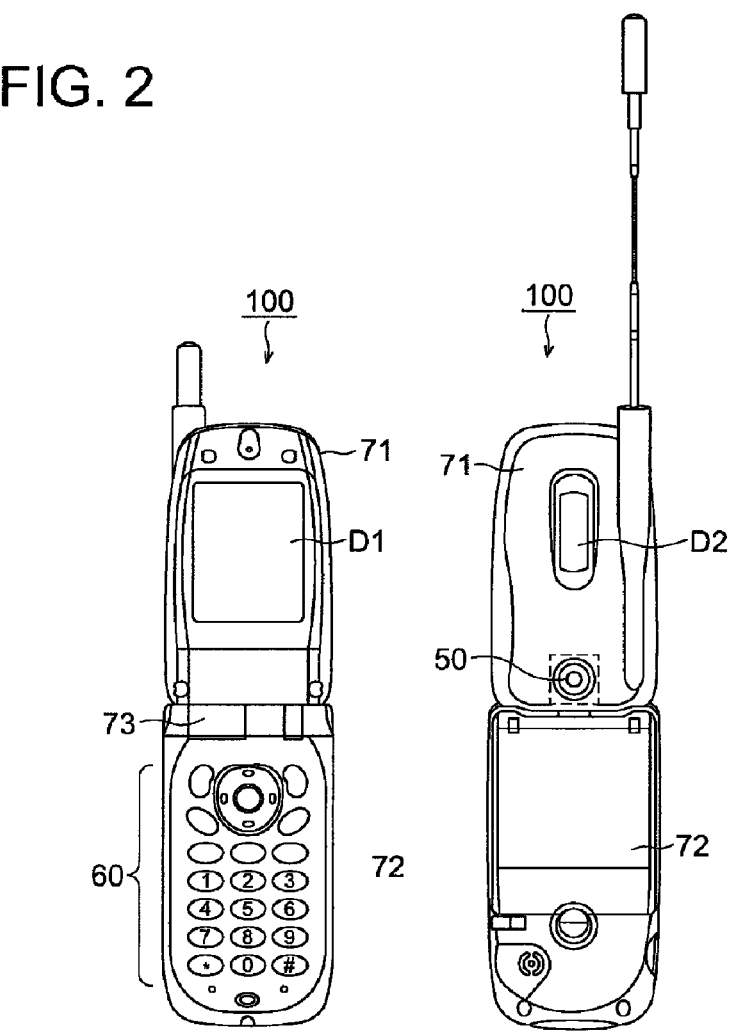
FIG. 2 shows outline views of a cell phone which is an example of a mobile terminal equipped with an image pickup apparatus relating to the present embodiment.

FIG. 2 shows outline views of cell phone 100 which is an example of a mobile terminal equipped with image pickup apparatus 50.

In cell phone 100 shown in the figure, upper casing 71 as a case provided with the display screens D1 and D2, and lower casing 72 provided with operation buttons 60 which is an input section, are connected together through hinge 73. Image pickup apparatus 50 is housed below the display screen D2 in upper casing 71, and image pickup apparatus 50 is arranged in such a manner that light can be taken from the outer-surface side of upper casing 71.

This image pickup apparatus may also be arranged above the display screen D2 of upper casing 71 or on the side surface of upper casing 71. Further, it is naturally understood that the cell phone is not limited to a folding type.

Figure 3:
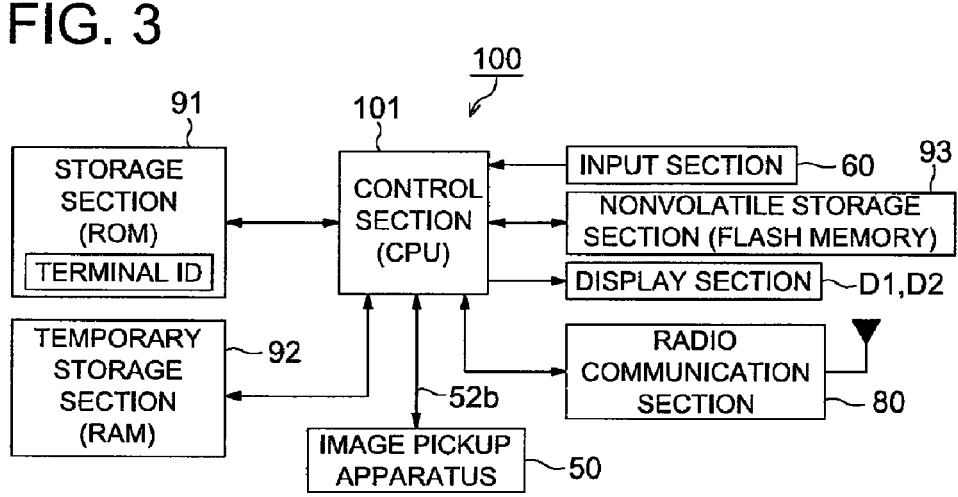
FIG. 3 shows an example of a control block diagram of a cell phone.

FIG. 3 is an example of a control block diagram of cell phone 100.

As shown in the figure, image pickup apparatus 50 is connected with control section 101 of cell phone 100 through flexible printed board 52b, and outputs image signal such as luminance signal and color difference signal to control section 101.

On the one hand, cell phone 100 is provided with: control section (CPU) 101 which centrally controls each section and executes programs corresponding to various processing; operation buttons 60 which is an input section for indicating and inputting the number; display screens D1 and D2 that display the predetermined data and images which are taken; radio communication section 80 for realizing various kinds of information communication to the external server; storage section (ROM) 91 which stores system programs of the cell phone 100, various processing programs, and necessary data such as terminal ID; and temporary storage section (RAM) 92 which temporarily stores various processing programs and data to be processed by control section 101, processed data, and image data from the image pickup apparatus 50 and is used as a working area.

Image signal inputted from image pickup apparatus 50 is stored in nonvolatile storage section (flash memory) 93, is displayed on display screens D1 and D2, or is transmitted to the outside as image information through radio communication section 80, by the control section 101 of cell phone 100. Further, mobile cell phone 100 includes a microphone and speaker for inputting and outputting voices, which are not illustrated.

EXAMPLES

Examples of the image pickup lens relating to the present invention will be shown below. Symbols used in each example are as follows.

f: Focal length of the total system of the image pickup lens
fB: Back focal length
F: F-number
2Y: Diagonal length of an image pickup surface of the solid-state image pickup element
ENTP: Position of an entrance pupil (distance from the first surface to the position of the entrance pupil)
EXTP: Position of an exit pupil (distance from the image pickup plane to the position of the exit pupil)
H1: Position of a front principal point (distance from the first surface to the position of the front principal point)
H2: Position of a rear principal point (distance from the rearmost surface to the position of the rear principal point)
r: Curvature radius
d: Surface distance on the optical axis
Nd: Refractive index of a lens material for d-line
vd: Abbe number of a lens material In each example, a surface represented by a surface number followed by an asterisk "*" is a surface in an aspheric shape.

The shape of the aspheric surface is expressed by the following (Math. 1), where the vertex of the surface is defined as the origin, X-axis extends along the optical axis direction, and h represents the height in a perpendicular direction to the optical axis.

$$X = \frac{h^2/R}{1 + \sqrt{1 - (1+K)h^2/R^2}} + \sum A_i h^i \quad [\text{Math. 1}]$$

In the expression, $A_i$ is i-th-order aspheric surface coefficient, R is a curvature radius, and K is a conic constant.

As for the aspheric surface coefficients, the power of 10 (for example, $2.5 \times 10^{-02}$) will be expressed as by using "E" (for example, 2.5E-02).

Example 1

All the specifications of the image pickup lens of Example 1 are listed below.

f=5.65 mm
fB=0.79 mm
F=2.06
2Y=7.140 mm
ENTP=0.00 mm
EXTP=−3.52 mm
H1=−1.76 mm
H2=−4.86 mm

Surface data of the image pickup lens of Example 1 are listed below.

| Surface number | r (mm) | d (mm) | Nd | vd | Effective radius (mm) |
|---|---|---|---|---|---|
| 1 (Stop) | ∞ | −0.40 | | | 1.37 |
| 2* | 2.215 | 1.03 | 1.54470 | 56.2 | 1.44 |
| 3* | −586.653 | 0.05 | | | 1.40 |
| 4* | 4.656 | 0.40 | 1.63200 | 23.4 | 1.38 |
| 5* | 2.296 | 0.88 | | | 1.32 |
| 6* | −8.258 | 0.52 | 1.63200 | 23.4 | 1.41 |
| 7* | −14.435 | 0.10 | | | 1.78 |
| 8* | −7.418 | 1.48 | 1.54470 | 56.2 | 2.11 |
| 9* | −1.387 | 0.41 | | | 2.39 |
| 10* | −10.485 | 0.50 | 1.54470 | 56.2 | 2.73 |
| 11* | 1.790 | 0.60 | | | 3.15 |
| 12 | ∞ | 0.15 | 1.51630 | 64.1 | 3.45 |
| 13 | ∞ | | | | 3.48 |

Aspheric surface coefficients are listed below.
Second Surface
K=0.21857E+00, A4=0.29339E−03, A6=0.47203E−03, A8=−0.12988E−02, A10=0.10888E−02, A12=−0.34643E−03, A14=0.34629E−04, A16=0.40700E−06
Third Surface
K=0.30000E+02, A4=0.58273E−02, A6=0.18979E−02, A8=0.75933E−03, A10=−0.13931E−03, A12=−0.46432E−03, A14=0.57197E−04, A16=−0.20970E−05
Fourth Surface
K=0.63662E+01, A4=−0.40425E−01, A6=0.17426E−01, A8=−0.72085E−02, A10=0.29070E−02, A12=−0.11301E−02, A14=−0.64825E−04
Fifth Surface
K=−0.42466E+01, A4=0.33662E−02, A6=0.17440E−01, A8=−0.91768E−02, A10=0.71040E−02, A12=−0.14212E−02, A14=0.11035E−04
Sixth Surface
K=0.32082E+02, A4=−0.48243E−01, A6=−0.10597E−01, A8=0.53627E−02, A10=0.30361E−03, A12=0.77117E−03, A14=0.76282E−04
Seventh Surface
K=0.30000E+02, A4=−0.31204E−01, A6=0.35199E−03, A8=0.36759E−03, A10=0.75107E−03, A12=0.11709E−03, A14=−0.63981E−04
Eighth Surface
K=0.19894E+01, A4=0.76139E−02, A6=0.30431E−02, A8=0.43518E−04, A10=−0.11382E−03, A12=−0.65140E−05, A14=0.19280E−05
Ninth Surface
K=−0.39657E+01, A4=−0.42077E−01, A6=0.15382E−01, A8=−0.27107E−02, A10=0.34375E−03, A12=−0.13909E−04, A14=−0.13610E−05

Tenth Surface
  K=0.61559E+01, A4=−0.43651E−01, A6=0.98617E−02, A8=−0.50206E−03, A10=−0.19419E−03, A12=0.38080E−04, A14=−0.20420E−05
Eleventh Surface
  K=−0.96030E+01, A4=−0.37012E−01, A6=0.71814E−02, A8=−0.10214E−02, A10=0.83677E−04, A12=−0.41810E−05, A14=0.10400E−06

Single lens data of the image pickup lens of Example 1 are listed below.

| Lens | Forefront surface | Focal length (mm) |
|---|---|---|
| 1 | 2 | 4.053 |
| 2 | 4 | −7.672 |
| 3 | 6 | −31.566 |
| 4 | 8 | 2.882 |
| 5 | 10 | −2.768 |

Values corresponding to the conditional expressions (1) to (6), and (8) to (10) of the image pickup lens of Example 1 are listed below.
(1) f12/f=1.134
(2) f2/f=−1.357
(3) r4/f=0.406
(4) ν1−ν2=32.6
(5) n2=1.632
(6) Pair23/P=−2.093
(8) |f3|/f=5.583
(9) d456/f=0.265
(10) L/2Y=0.961

Figure 4:
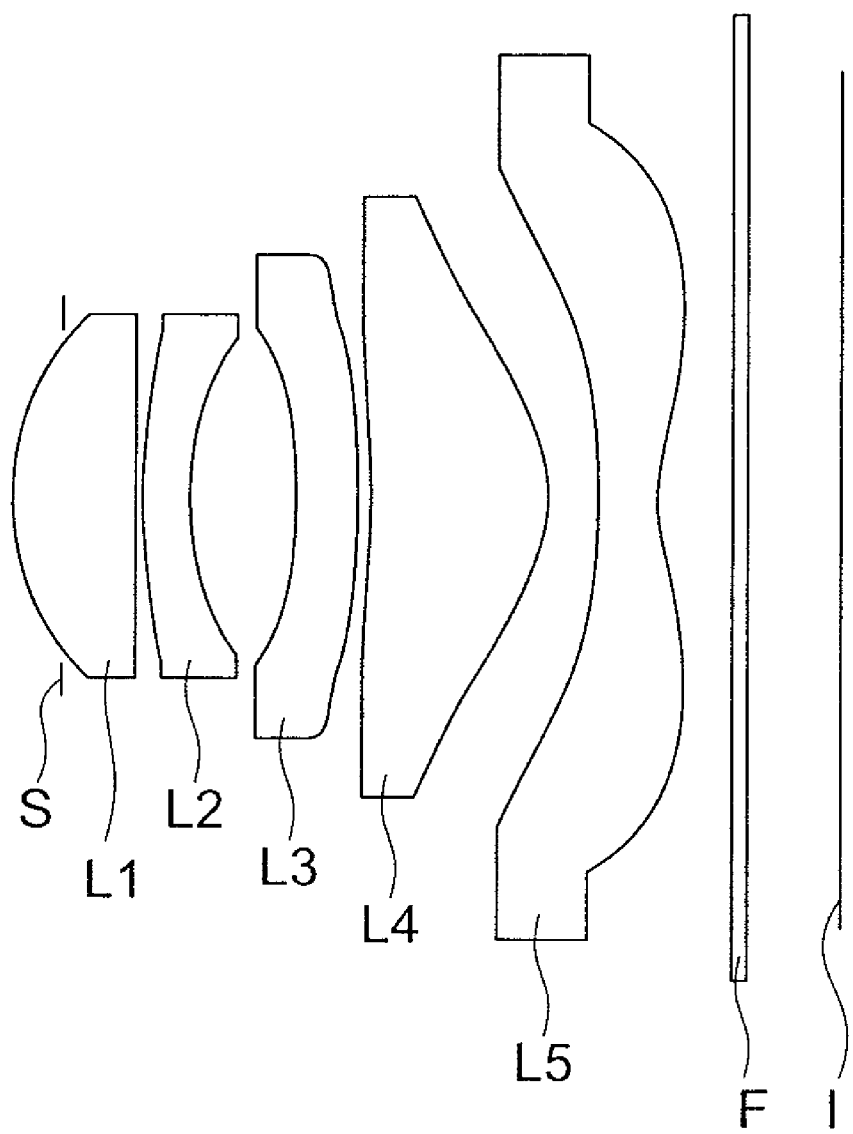
FIG. 4 shows a sectional view of the image pickup lens of Example 1.
Figure 5:
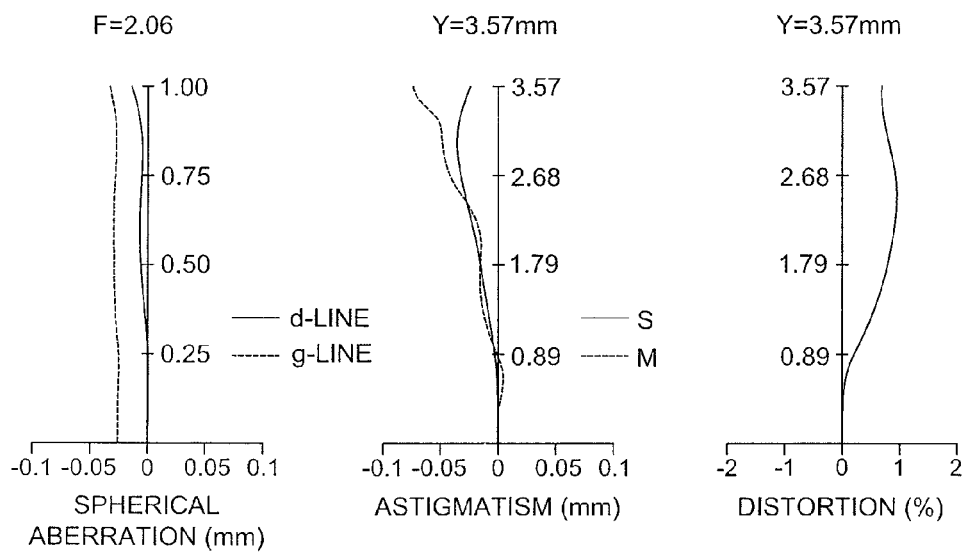
FIG. 5 shows aberration diagrams of the image pickup lens of Example 1 (spherical aberration, astigmatism, distortion, and meridional coma).
Figure 5:
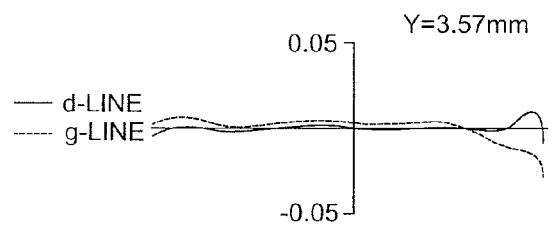
Figure 5:
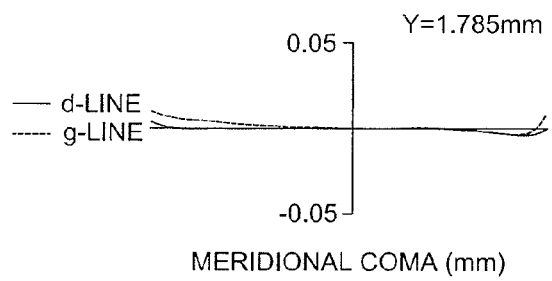

In Example 1, each of lenses is formed of a plastic material.
FIG. 4 shows a sectional view of the image pickup lens of Example 1. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 5 shows aberration diagrams (spherical aberration, astigmatism, distortion, and meridional coma) of the image pickup lens of Example 1.

Example 2

All the specifications of the image pickup lens of Example 2 are listed below.
f=5.73 mm
fB=0.36 mm
F=2.06
2Y=7.140 mm
ENTP=0.00 mm
EXTP=−3.36 mm
H1=−3.08 mm
H2=−5.36 mm Surface data of the image pickup lens of Example 2 are listed below.

| Surface number | r (mm) | d (mm) | Nd | νd | Effective radius (mm) |
|---|---|---|---|---|---|
| 1 (Stop) | ∞ | −0.39 | | | 1.39 |
| 2* | 2.310 | 1.04 | 1.54470 | 56.2 | 1.45 |
| 3* | −21.818 | 0.05 | | | 1.42 |
| 4* | 7.361 | 0.40 | 1.63200 | 23.4 | 1.40 |
| 5* | 2.718 | 0.74 | | | 1.37 |
| 6* | −8.295 | 0.89 | 1.54470 | 56.0 | 1.47 |
| 7* | −10.387 | 0.09 | | | 1.81 |
| 8* | −15.009 | 1.19 | 1.54470 | 56.2 | 1.87 |
| 9* | −2.234 | 0.90 | | | 2.21 |
| 10* | −4.038 | 0.51 | 1.54470 | 56.2 | 2.64 |
| 11* | 3.829 | 0.60 | | | 3.14 |
| 12 | ∞ | 0.15 | 1.51630 | 64.1 | 3.55 |
| 13 | ∞ | | | | 3.58 |

Aspheric surface coefficients are listed below.
Second Surface
  K=0.21872E+00, A4=−0.43653E−03, A6=0.16254E−02, A8=−0.19526E−02, A10=0.12106E−02, A12=−0.25985E−03, A14=0.13192E−04
Third Surface
  K=−0.30000E+02, A4=0.16876E−01, A6=−0.16928E−02, A8=0.14951E−03, A10=−0.28576E−04, A12=−0.23762E−03, A14=−0.62790E−05
Fourth Surface
  K=0.14738E+02, A4=−0.16775E−01, A6=0.13255E−01, A8=−0.80227E−02, A10=0.28381E−02, A12=−0.13054E−02, A14=0.91730E−04
Fifth Surface
  K=−0.36991E+01, A4=0.16472E−02, A6=0.20755E−01, A8=−0.80020E−02, A10=0.49320E−02, A12=−0.20503E−02, A14=0.33114E−03
Sixth Surface
  K=0.28805E+02, A4=−0.11426E−01, A6=−0.13054E−02, A8=0.52349E−02, A10=−0.10253E−02, A12=−0.75642E−04, A14=0.13900E−03
Seventh Surface
  K=0.30000E+02, A4=−0.95828E−02, A6=−0.10667E−02, A8=−0.17348E−03, A10=−0.32525E−04, A12=−0.56450E−05, A14=−0.69500E−06
Eighth Surface
  K=0.30000E+02, A4=−0.31257E−02, A6=−0.98037E−03, A8=−0.12892E−03, A10=−0.19314E−04, A12=−0.64080E−05, A14=−0.28790E−05
Ninth Surface
  K=−0.57350E+01, A4=−0.35001E−01, A6=0.12792E−01, A8=−0.26529E−02, A10=0.42193E−03, A12=−0.62270E−05, A14=−0.31110E−05
Tenth Surface
  K=0.49387E+00, A4=−0.42585E−01, A6=0.11271E−01, A8=−0.56345E−03, A10=−0.19862E−03, A12=0.38293E−04, A14=−0.19550E−05
Eleventh Surface
  K=−0.22116E+02, A4=−0.31591E−01, A6=0.59975E−02, A8=−0.88137E−03, A10=0.81496E−04, A12=−0.47600E−05, A14=0.11100E−06

Single lens data of the image pickup lens of Example 2 are listed below.

| Lens | Forefront surface | Focal length (mm) |
|---|---|---|
| 1 | 2 | 3.894 |
| 2 | 4 | −7.056 |
| 3 | 6 | −88.872 |
| 4 | 8 | 4.664 |
| 5 | 10 | −3.528 |

Values corresponding to the conditional expressions (1) to (6), and (8) to (10) of the image pickup lens of Example 2 are listed below.
(1) f12/f=1.133
(2) f2/f=−1.232
(3) r4/f=0.475
(4) ν1−ν2=32.6
(5) n2=1.632
(6) Pair23/P=−1.772
(8) |f3|/f=15.518
(9) d456/f=0.298
(10) L/2Y=0.961

In Example 2, each of lenses is formed of a plastic material.

Figure 6:
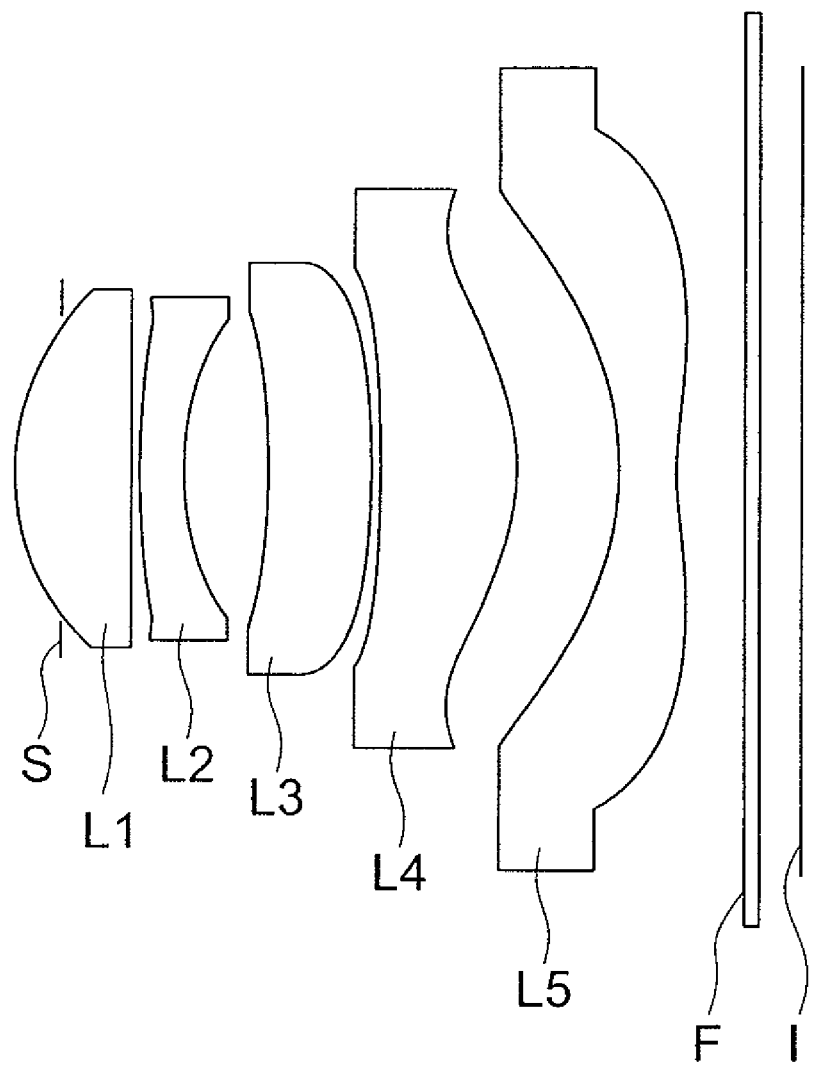
FIG. 6 shows a sectional view of the image pickup lens of Example 2.
Figure 7:
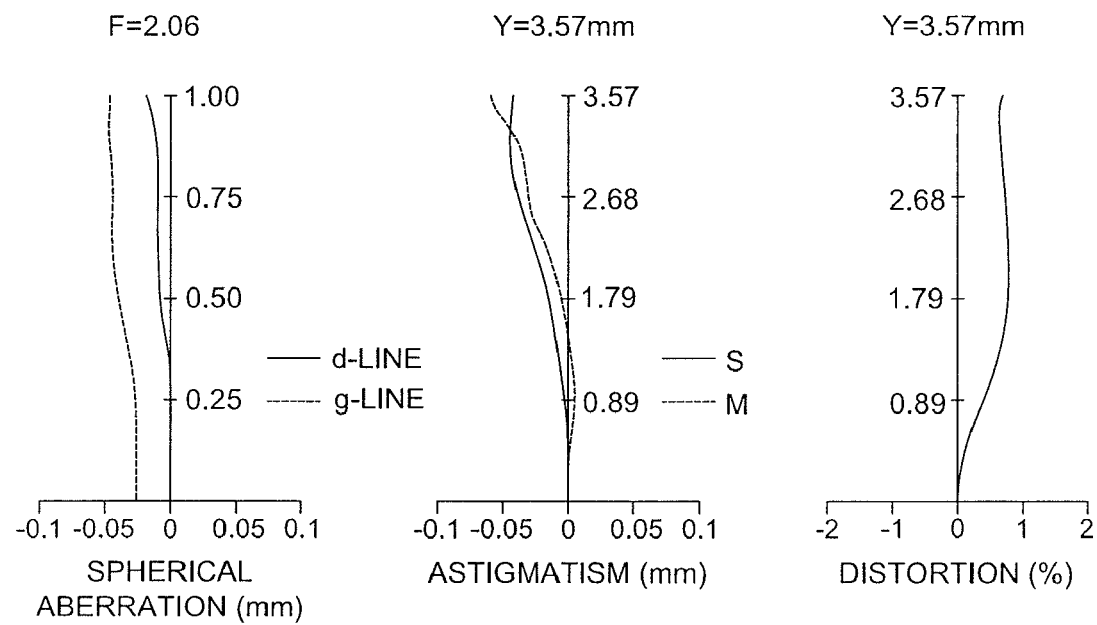
FIG. 7 shows aberration diagrams of the image pickup lens of Example 2 (spherical aberration, astigmatism, distortion, and meridional coma).
Figure 7:
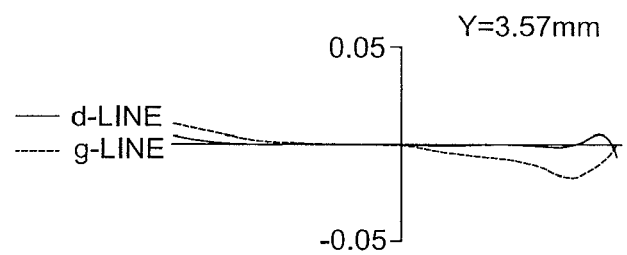
Figure 7:
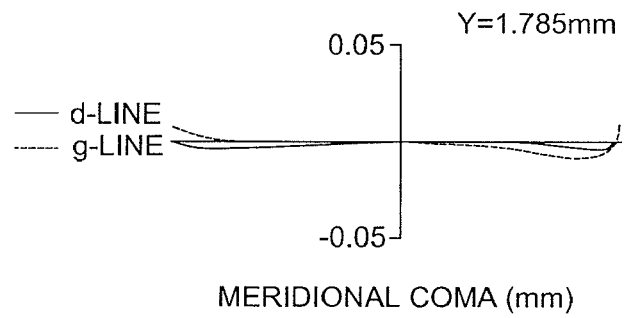

FIG. 6 shows a sectional view of the image pickup lens of Example 2. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 7 shows aberration diagrams (spherical aberration, astigmatism, distortion, and meridional coma) of the image pickup lens of Example 2.

Example 3

All the specifications of the image pickup lens of Example 3 are listed below.
f=5.61 mm
fB=0.66 mm
F=2.06
2Y=7.140 mm
ENTP=0.00 mm
EXTP=−3.33 mm
H1=−2.29 mm
H2=−4.96 mm Surface data of the image pickup lens of Example 3 are listed below.

| Surface number | r (mm) | d (mm) | Nd | νd | Effective radius (mm) |
|---|---|---|---|---|---|
| 1 (Stop) | ∞ | −0.38 | | | 1.36 |
| 2* | 2.280 | 0.97 | 1.54470 | 56.2 | 1.42 |
| 3* | 60.204 | 0.05 | | | 1.39 |
| 4* | 4.356 | 0.40 | 1.63200 | 23.4 | 1.39 |
| 5* | 2.389 | 0.82 | | | 1.34 |
| 6* | −8.520 | 0.39 | 1.63200 | 23.4 | 1.44 |
| 7* | −14.691 | 0.09 | | | 1.66 |
| 8* | −23.903 | 1.75 | 1.54470 | 56.2 | 1.92 |
| 9* | −1.695 | 0.44 | | | 2.46 |
| 10* | −8.586 | 0.60 | 1.54470 | 56.2 | 2.73 |
| 11* | 1.990 | 0.60 | | | 3.16 |
| 12 | ∞ | 0.15 | 1.51630 | 64.1 | 3.38 |
| 13 | ∞ | | | | 3.42 |

Aspheric surface coefficients are listed below.
Second Surface
K=0.22694E+00, A4=0.18590E−04, A6=0.11569E−02, A8=−0.13986E−02, A10=0.10509E−02, A12=−0.33663E−03, A14=0.47668E−04, A16=0.13853E−04
Third Surface
K=0.30000E+02, A4=0.17132E−02, A6=0.43435E−02, A8=0.10139E−02, A10=−0.10033E−03, A12=−0.40770E−03, A14=0.10269E−03, A16=0.51383E−04
Fourth Surface
K=0.60221E+01, A4=−0.39201E−01, A6=0.15832E−01, A8=−0.70161E−02, A10=0.32874E−02, A12=−0.96583E−03, A14=−0.62578E−04
Fifth Surface
K=−0.32826E+01, A4=0.12941E−03, A6=0.15212E−01, A8=−0.76313E−02, A10=0.74565E−02, A12=−0.15810E−02, A14=−0.15762E−03
Sixth Surface
K=0.32073E+02, A4=−0.40141E−01, A6=−0.46016E−02, A8=0.70656E−02, A10=0.50951E−03, A12=0.52547E−03, A14=−0.96185E−04
Seventh Surface
K=0.10896E+02, A4=−0.34996E−01, A6=0.30209E−02, A8=0.79884E−03, A10=0.78677E−03, A12=0.10670E−03, A14=−0.76501E−04
Eighth Surface
K=0.30000E+02, A4=0.47224E−02, A6=0.18239E−02, A8=−0.43199E−04, A10=−0.12179E−03, A12=−0.68420E−05, A14=0.21960E−05
Ninth Surface
K=−0.50653E+01, A4=−0.32301E−01, A6=0.15164E−01, A8=−0.27777E−02, A10=0.32857E−03, A12=−0.14988E−04, A14=−0.10960E−05
Tenth Surface
K=−0.66386E+01, A4=−0.40847E−01, A6=0.10072E−01, A8=−0.47451E−03, A10=−0.19241E−03, A12=0.37777E−04, A14=−0.21300E−05
Eleventh Surface
K=−0.90272E+01, A4=−0.30972E−01, A6=0.65030E−02, A8=−0.96594E−03, A10=0.84387E−04, A12=−0.43170E−05, A14=0.10600E−06

Single lens data of the image pickup lens of Example 3 are listed below.

| Lens | Forefront surface | Focal length (mm) |
|---|---|---|
| 1 | 2 | 4.325 |
| 2 | 4 | −9.084 |
| 3 | 6 | −32.898 |
| 4 | 8 | 3.259 |
| 5 | 10 | −2.908 |

Values corresponding to the conditional expressions (1) to (6), and (8) to (10) of the image pickup lens of Example 3 are listed below.
(1) f12/f=1.158
(2) f2/f=−1.619
(3) r4/f=0.426
(4) ν1−ν2=32.6
(5) n2=1.632
(6) Pair23/P=−1.991
(8) |f3|/f=5.862
(9) d456/f=0.231
(10) L/2Y=0.961

In Example 3, each of lenses is formed of a plastic material.

Figure 8:
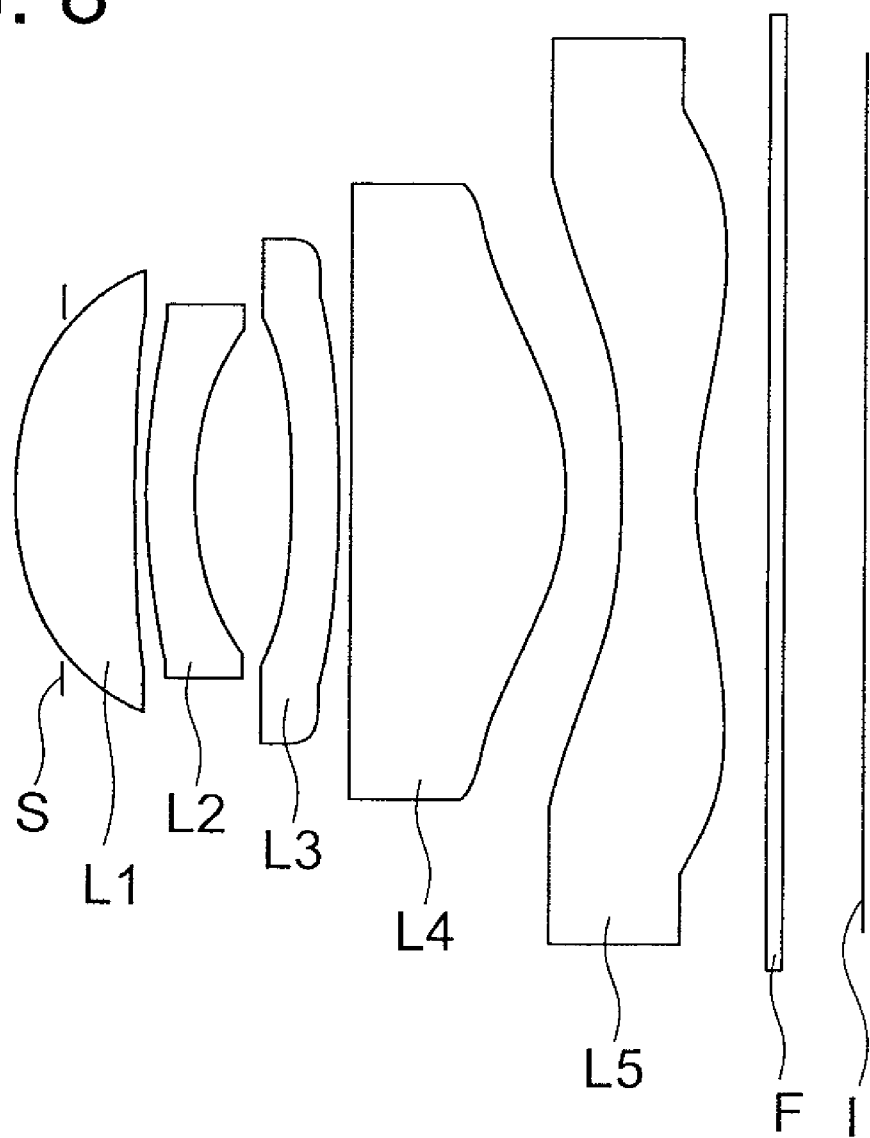
FIG. 8 shows a sectional view of the image pickup lens of Example 3.
Figure 9:
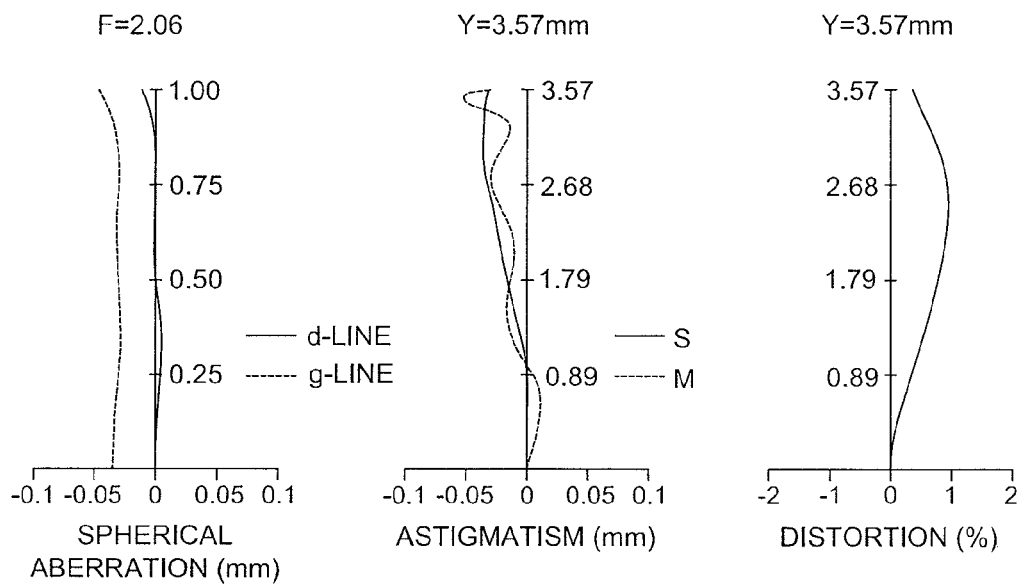
FIG. 9 shows aberration diagrams of the image pickup lens of Example 3 (spherical aberration, astigmatism, distortion, and meridional coma).
Figure 9:
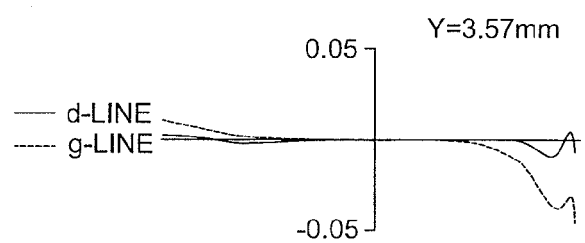
Figure 9:
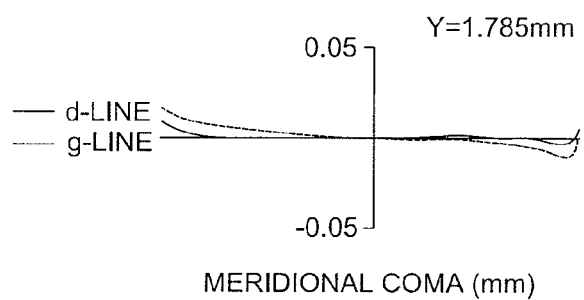

FIG. 8 shows a sectional view of the image pickup lens of Example 3. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 9 shows aberration diagrams (spherical aberration, astigmatism, distortion, and meridional coma) of the image pickup lens of Example 3.

Example 4

All the specifications of the image pickup lens of Example 4 are listed below.
f=5.61 mm
fB=0.36 mm
F=2.06
2Y=7.140 mm
ENTP=0.00 mm
EXTP=−3.38 mm
H1=−2.80 mm
H2=−5.25 mm Surface data of the image pickup lens of Example 4 are listed below.

| Surface number | r (mm) | d (mm) | Nd | vd | Effective radius (mm) |
|---|---|---|---|---|---|
| 1 (Stop) | ∞ | −0.33 | | | 1.36 |
| 2* | 2.554 | 1.03 | 1.54470 | 56.2 | 1.43 |
| 3* | −29.139 | 0.06 | | | 1.40 |
| 4* | 4.187 | 0.40 | 1.63200 | 23.4 | 1.43 |
| 5* | 2.024 | 0.80 | | | 1.45 |
| 6* | −9.133 | 0.76 | 1.54470 | 56.2 | 1.56 |
| 7* | −3.158 | 0.51 | | | 1.78 |
| 8* | −3.098 | 0.83 | 1.54470 | 56.2 | 2.24 |
| 9* | −1.858 | 0.90 | | | 2.41 |
| 10* | −14.682 | 0.50 | 1.54470 | 56.2 | 2.80 |
| 11* | 2.213 | 0.60 | | | 3.22 |
| 12 | ∞ | 0.15 | 1.51630 | 64.1 | 3.53 |
| 13 | ∞ | | | | 3.57 |

Aspheric surface coefficients are listed below.
Second Surface
  K=0.29377E+00, A4=0.15368E−02, A6=0.24805E−02, A8=−0.17788E−02, A10=0.11217E−02, A12=−0.24895E−03, A14=0.62224E−04
Third Surface
  K=−0.30000E+02, A4=0.16680E−01, A6=−0.14116E−02, A8=0.17823E−02, A10=0.45256E−04, A12=−0.32581E−03, A14=0.31983E−03
Fourth Surface
  K=−0.25530E+01, A4=−0.36923E−01, A6=0.15093E−01, A8=−0.76225E−02, A10=0.35689E−02, A12=−0.82534E−03, A14=0.90528E−04
Fifth Surface
  K=−0.35968E+01, A4=−0.79084E−02, A6=0.12894E−01, A8=−0.82870E−02, A10=0.55697E−02, A12=−0.18973E−02, A14=0.26203E−03
Sixth Surface
  K=0.29911E+02, A4=−0.91254E−02, A6=−0.70032E−02, A8=0.38774E−02, A10=−0.62823E−03, A12=0.13750E−03, A14=0.82812E−04
Seventh Surface
  K=−0.82136E+01, A4=−0.21808E−01, A6=−0.99771E−03, A8=0.13069E−04, A10=0.70065E−04, A12=0.32811E−04, A14=0.10138E−04
Eighth Surface
  K=−0.10688E+02, A4=0.23875E−02, A6=0.78342E−03, A8=0.20442E−03, A10=0.15400E−04, A12=−0.23940E−05, A14=−0.11160E−05
Ninth Surface
  K=−0.53403E+01, A4=−0.29088E−01, A6=0.13318E−01, A8=−0.27984E−02, A10=0.39290E−03, A12=−0.76800E−05, A14=−0.23880E−05
Tenth Surface
  K=0.11262E+02, A4=−0.52401E−01, A6=0.10923E−01, A8=−0.55106E−03, A10=−0.19886E−03, A12=0.38280E−04, A14=−0.19510E−05
Eleventh Surface
  K=−0.97709E+01, A4=−0.31957E−01, A6=0.61905E−02, A8=−0.91975E−03, A10=0.81571E−04, A12=−0.45010E−05, A14=0.12400E−06

Single lens data of the image pickup lens of Example 4 are listed below.

| Lens | Forefront surface | Focal length (mm) |
|---|---|---|
| 1 | 2 | 4.361 |
| 2 | 4 | −6.680 |
| 3 | 6 | 8.479 |
| 4 | 8 | 6.891 |
| 5 | 10 | −3.495 |

Values corresponding to the conditional expressions (1) to (6), and (8) to (10) of the image pickup lens of Example 4 are listed below.
(1) f12/f=1.477
(2) f2/f=−1.190
(3) r4/f=0.361
(4) ν1−ν2=32.6
(5) n2=1.632
(6) Pair23/P=−2.171
(8) |f3|/f=1.510
(9) d456/f=0.370
(10) L/2Y=0.960

Figure 10:
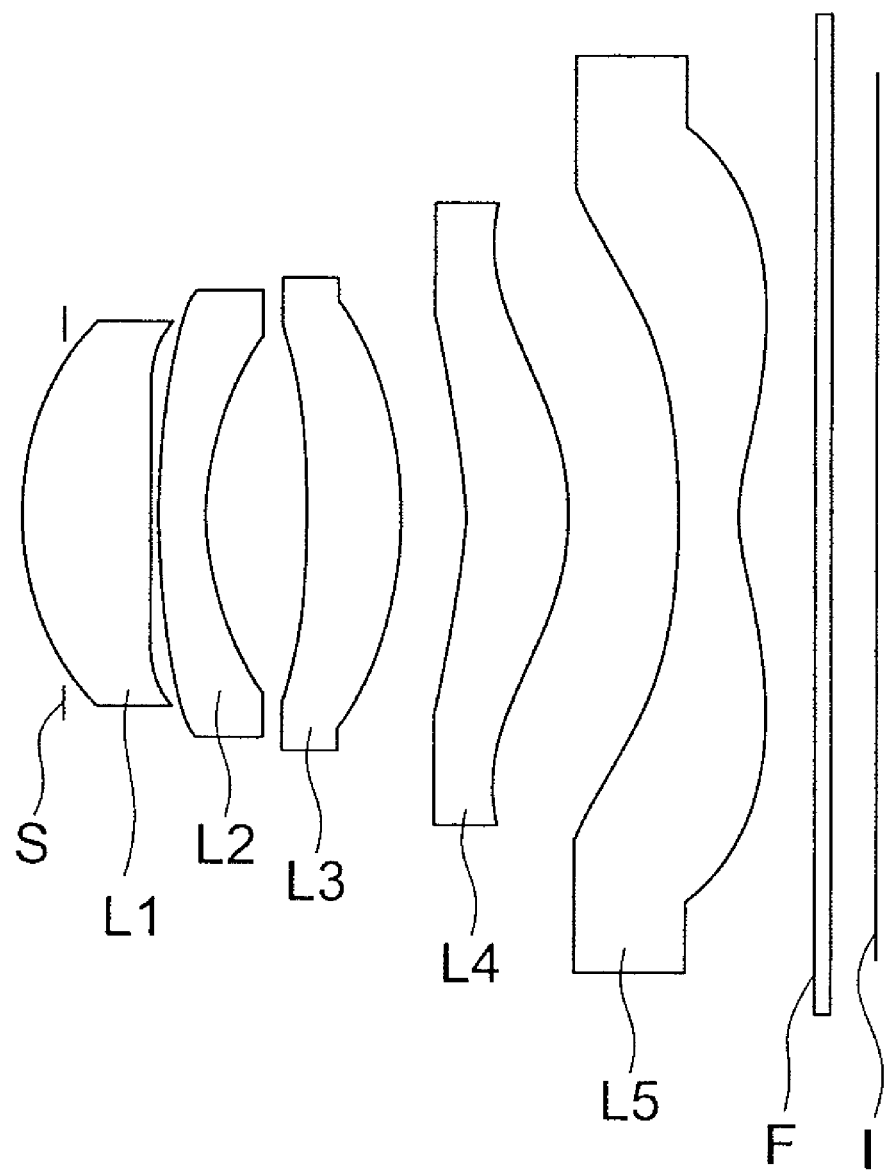
FIG. 10 shows a sectional view of the image pickup lens of Example 4.
Figure 11:
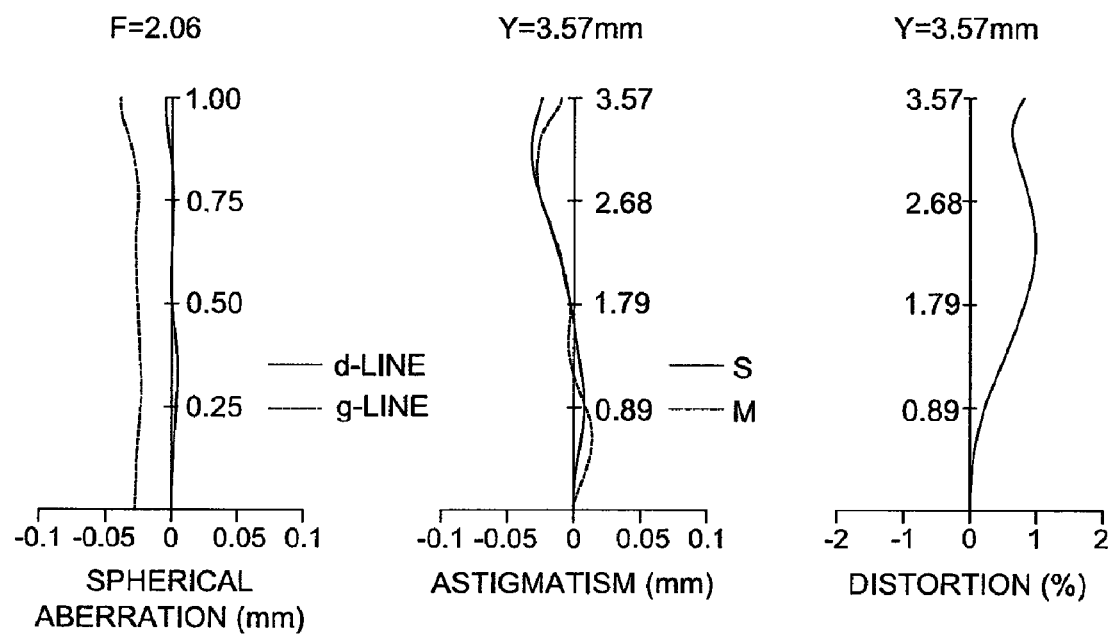
FIG. 11 shows aberration diagrams of the image pickup lens of Example 4 (spherical aberration, astigmatism, distortion, and meridional coma).
Figure 11:
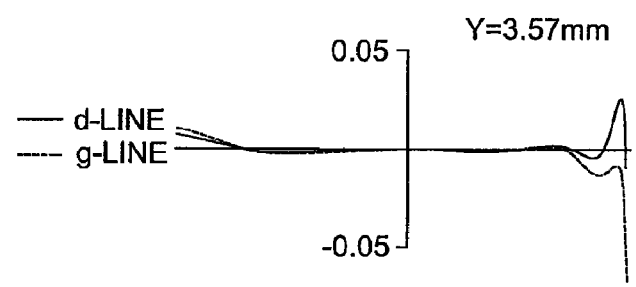
Figure 11:
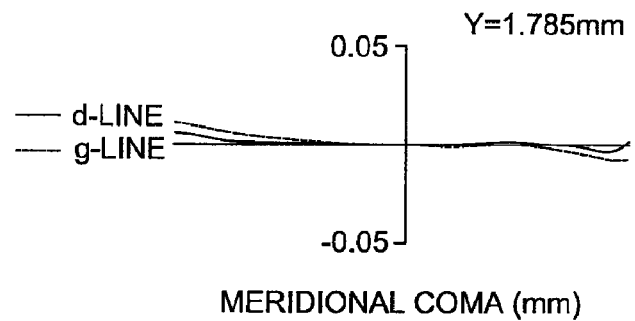

In Example 4, each of lenses is formed of a plastic material.
FIG. 10 shows a sectional view of the image pickup lens of Example 4. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 11 shows aberration diagrams (spherical aberration, astigmatism, distortion, and meridional coma) of the image pickup lens of Example 4.

Example 5

All the specifications of the image pickup lens of Example 5 are listed below.
f=5.77 mm
fB=0.23 mm
F=2.06
2Y=7.140 mm
ENTP=0.00 mm
EXTP=−3.41 mm
H1=−3.38 mm
H2=−5.54 mm Surface data of the image pickup lens of Example 5 are listed below.

| Surface number | r (mm) | d (mm) | Nd | vd | Effective radius (mm) |
|---|---|---|---|---|---|
| 1 (Stop) | ∞ | −0.43 | | | 1.40 |
| 2* | 2.329 | 0.99 | 1.49700 | 81.0 | 1.40 |
| 3* | 37.946 | 0.20 | | | 1.39 |
| 4* | 3.101 | 0.40 | 1.63200 | 23.4 | 1.43 |

-continued

| Surface number | r (mm) | d (mm) | Nd | vd | Effective radius (mm) |
|---|---|---|---|---|---|
| 5* | 2.061 | 0.87 | | | 1.41 |
| 6* | −9.283 | 0.50 | 1.54470 | 56.2 | 1.58 |
| 7* | 21.886 | 0.23 | | | 1.86 |
| 8* | 6.108 | 1.43 | 1.54470 | 56.2 | 2.26 |
| 9* | −2.523 | 0.80 | | | 2.53 |
| 10* | −2.857 | 0.50 | 1.54470 | 56.2 | 2.79 |
| 11* | 5.044 | 0.60 | | | 3.22 |
| 12 | ∞ | 0.15 | 1.51630 | 64.1 | 3.60 |
| 13 | ∞ | | | | 3.64 |

Aspheric surface coefficients are listed below.

Second Surface
  K=0.20251E+00, A4=−0.79646E−03, A6=0.18757E−02, A8=−0.17493E−02, A10=0.12709E−02, A12=−0.31631E−03, A14=0.91500E−05, A16=0.16924E−04

Third Surface
  K=0.30000E+02, A4=−0.50808E−02, A6=0.11253E−01, A8=−0.38116E−02, A10=0.94986E−03, A12=0.30224E−04, A14=−0.12530E−03, A16=0.64213E−04

Fourth Surface
  K=0.16136E+01, A4=−0.49199E−01, A6=0.19614E−01, A8=−0.87208E−02, A10=0.23983E−02, A12=−0.62276E−03, A14=0.25973E−04

Fifth Surface
  K=−0.30823E+01, A4=0.71074E−03, A6=0.13793E−01, A8=−0.72002E−02, A10=0.63443E−02, A12=−0.26787E−02, A14=0.42393E−03, Sixth Surface
  K=0.30000E+02, A4=−0.43396E−01, A6=0.23275E−02, A8=0.26839E−02, A10=0.86392E−03, A12=0.69765E−03, A14=−0.24180E−03

Seventh Surface
  K=−0.30000E+02, A4=−0.74959E−01, A6=0.10109E−01, A8=−0.26199E−03, A10=0.73873E−03, A12=0.21845E−03, A14=−0.85434E−04

Eighth Surface
  K=−0.18613E+01, A4=−0.33465E−01, A6=0.85736E−04, A8=0.14325E−02, A10=−0.70444E−04, A12=−0.28393E−04, A14=0.23740E−05

Ninth Surface
  K=−0.70987E+01, A4=−0.27789E−01, A6=0.89909E−02, A8=−0.25339E−02, A10=0.37953E−03, A12=−0.12827E−04, A14=−0.99000E−06

Tenth Surface
  K=−0.18307E+01, A4=−0.36272E−01, A6=0.90771E−02, A8=−0.43830E−03, A10=−0.19921E−03, A12=0.37408E−04, A14=−0.18940E−05

Eleventh Surface
  K=−0.30000E+02, A4=−0.30376E−01, A6=0.54714E−02, A8=−0.85228E−03, A10=0.85435E−04, A12=−0.55890E−05, A14=0.17600E−06

Single lens data of the image pickup lens of Example 5 are listed below.

| Lens | Forefront surface | Focal length (mm) |
|---|---|---|
| 1 | 2 | 4.947 |
| 2 | 4 | −11.426 |
| 3 | 6 | −11.900 |
| 4 | 8 | 3.482 |
| 5 | 10 | −3.276 |

Values corresponding to the conditional expressions (1) to (6), and (8) to (10) of the image pickup lens of Example 5 are listed below.

(1) f12/f=1.190
(2) f2/f=−1.981
(3) r4/f=0.357
(4) v1−v2=57.6
(5) n2=1.632
(6) Pair23/P=−2.198
(8) |f3|/f=2.063
(9) d456/f=0.278
(10) L/2Y=0.960

In Example 5, the first lens is formed of a molded glass lens, and each of the second through fifth lenses is formed of a plastic material.

Figure 12:
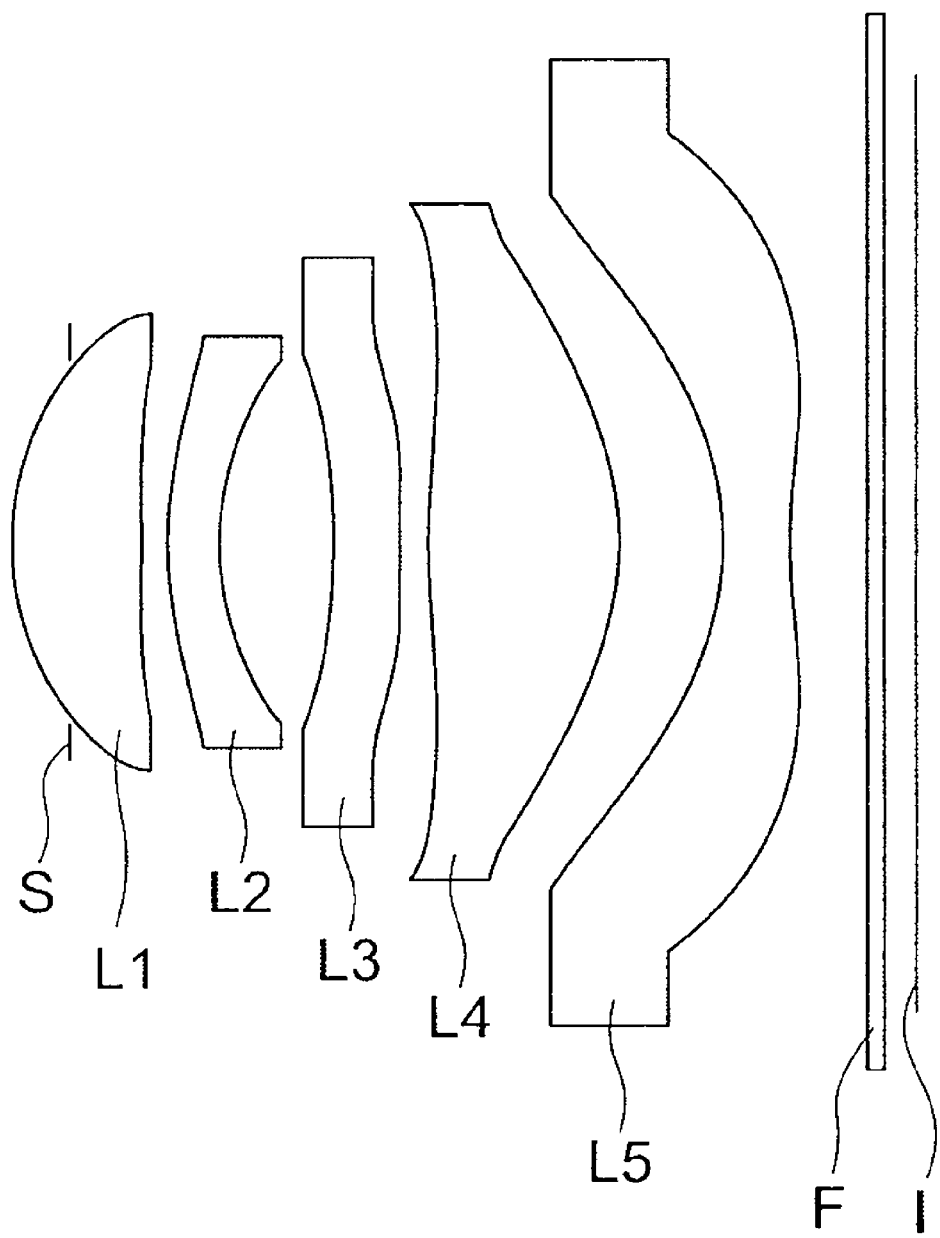
FIG. 12 shows a sectional view of the image pickup lens of Example 5.
Figure 13:
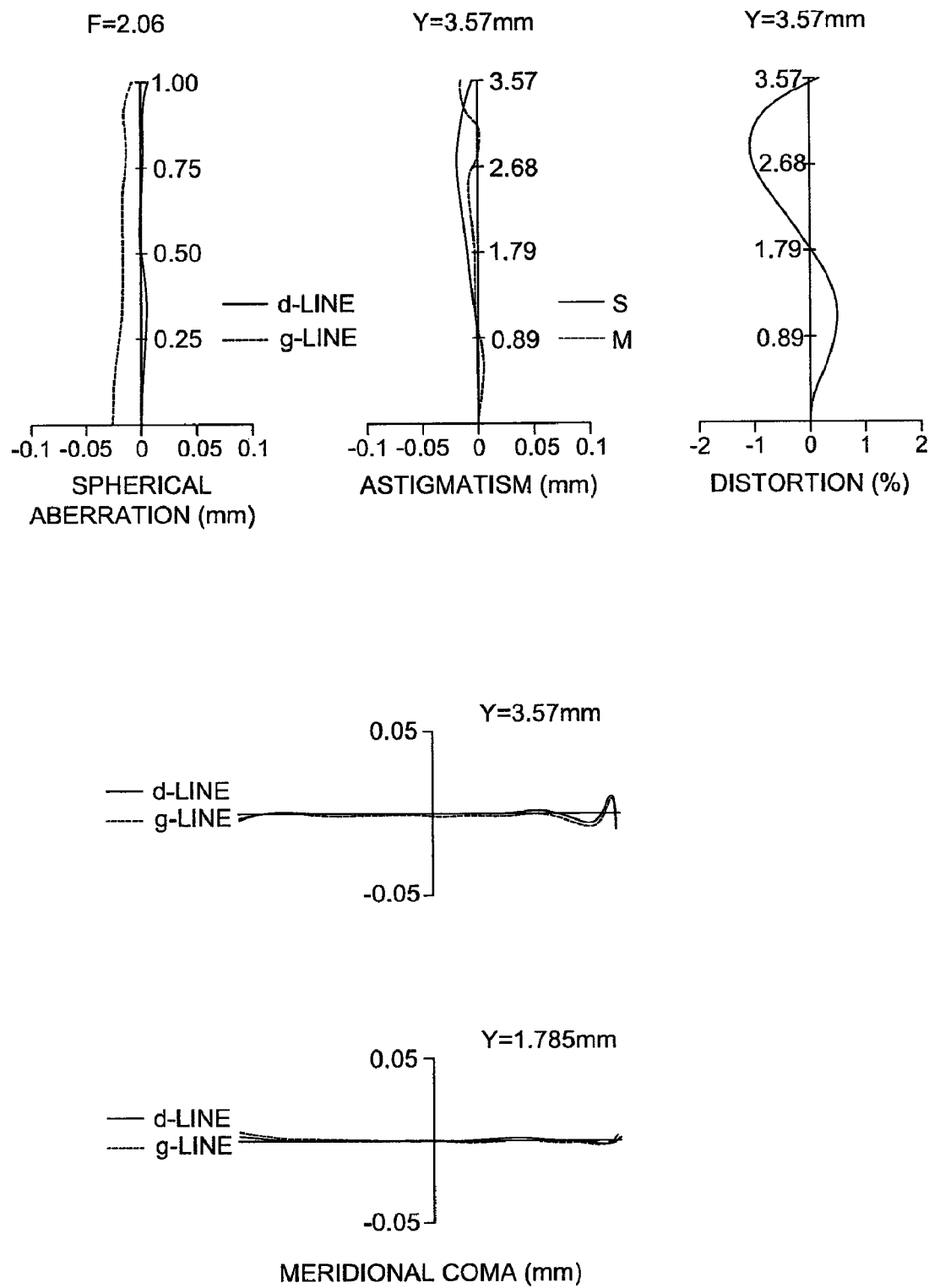
FIG. 13 shows aberration diagrams of the image pickup lens of Example 5 (spherical aberration, astigmatism, distortion, and meridional coma).

FIG. 12 shows a sectional view of the image pickup lens of Example 5. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 13 shows aberration diagrams (spherical aberration, astigmatism, distortion, and meridional coma) of the image pickup lens of Example 5.

Example 6

All the specifications of the image pickup lens of Example 6 are listed below.

f=4.93 mm
fB=1.00 mm
F=2.06
2Y=7.140 mm
ENTP=0.00 mm
EXTP=−3.78 mm
H1=−0.15 mm
H2=−3.92 mm

Surface data of the image pickup lens of Example 6 are listed below.

| Surface number | r (mm) | d (mm) | Nd | vd | Effective radius (mm) |
|---|---|---|---|---|---|
| 1 (Stop) | ∞ | −0.23 | | | 1.19 |
| 2* | 2.665 | 0.85 | 1.54470 | 56.2 | 1.20 |
| 3* | −58.565 | 0.05 | | | 1.28 |
| 4* | 5.418 | 0.40 | 1.63200 | 23.4 | 1.31 |
| 5* | 3.021 | 0.66 | | | 1.37 |
| 6* | 34.726 | 0.50 | 1.63200 | 23.4 | 1.35 |
| 7* | 7.516 | 0.11 | | | 1.74 |
| 8* | −8.533 | 1.71 | 1.54470 | 56.2 | 1.99 |
| 9* | −1.181 | 0.22 | | | 2.17 |
| 10* | 8.922 | 0.66 | 1.54470 | 56.2 | 2.71 |
| 11* | 1.215 | 0.60 | | | 3.26 |
| 12 | ∞ | 0.15 | 1.51630 | 64.1 | 3.48 |
| 13 | ∞ | | | | 3.50 |

Aspheric surface coefficients are listed below.

Second Surface
  K=0.19361E+00, A4=−0.12007E−03, A6=0.10971E−02, A8=−0.21027E−02, A10=0.10782E−02, A12=−0.32493E−03, A14=−0.18897E−04, A16=−0.17190E−04

Third Surface
  K=0.19270E+02, A4=0.69555E-02, A6=0.15205 E-02, A8=-0.39410E-02, A10=-0.11630E-02, A12=-0.38025E-03, A14=0.45100E-03, A16=-0.15763E-04
Fourth Surface
  K=0.80889E+01, A4=-0.31840E-01, A6=0.15405 E-01, A8=-0.11624E-01, A10=0.10547E-02, A12=-0.11480E-02, A14=0.60122E-03
Fifth Surface
  K=-0.79886E+01, A4=-0.15359E-01, A6=0.71172 E-02, A8=-0.12256E-01, A10=0.43282E-02, A12=-0.25095E-02, A14=0.35186E-03
Sixth Surface
  K=-0.30000E+02, A4=-0.86169E-01, A6=-0.13295E-01, A8=-0.26623E-02, A10=-0.25559E-02, A12=0.51722E-03, A14=0.10940E-03
Seventh Surface
  K=-0.30000E+02, A4=-0.39031E-01, A6=0.82630E-03, A8=0.27459E-03, A10=0.46098E-03, A12=0.70396E-04, A14=-0.19480E-04
Eighth Surface
  K=-0.29314E+02, A4=0.38879E-02, A6=0.34032E-02, A8=0.13683 E-03, A10=-0.13016E-03, A12=-0.12700E-04, A14=0.48110E-05
Ninth Surface
  K=-0.33988E+01, A4=-0.50420E-01, A6=0.12125 E-01, A8=-0.24328E-02, A10=0.43971E-03, A12=-0.91800E-05, A14=-0.14760E-05
Tenth Surface
  K=-0.50566E+01, A4=-0.54533E-01, A6=0.93922E-02, A8=-0.49089E-03, A10=-0.19221E-03, A12=0.37826E-04, A14=-0.19210E-05
Eleventh Surface
  K=-0.54672E+01, A4=-0.33453E-01, A6=0.64837E-02, A8=-0.10105E-02, A10=0.90814E-04, A12=-0.45890E-05, A14=0.10000E-06

Single lens data of the image pickup lens of Example 6 are listed below.

| Lens | Forefront surface | Focal length (mm) |
|---|---|---|
| 1 | 2 | 4.703 |
| 2 | 4 | -11.553 |
| 3 | 6 | -15.287 |
| 4 | 8 | 2.326 |
| 5 | 10 | -2.662 |

Values corresponding to the conditional expressions (1) to (6), and (8) to (10) of the image pickup lens of Example 6 are listed below.
(1) f12/f=1.375
(2) f2/f=-2.345
(3) r4/f=0.613
(4) v1-v2=32.6
(5) n2=1.632
(6) Pair23/P=-0.929
(8) |f3|/f=3.103
(9) d456/f=0.258
(10) L/2Y=0.961

Figure 14:
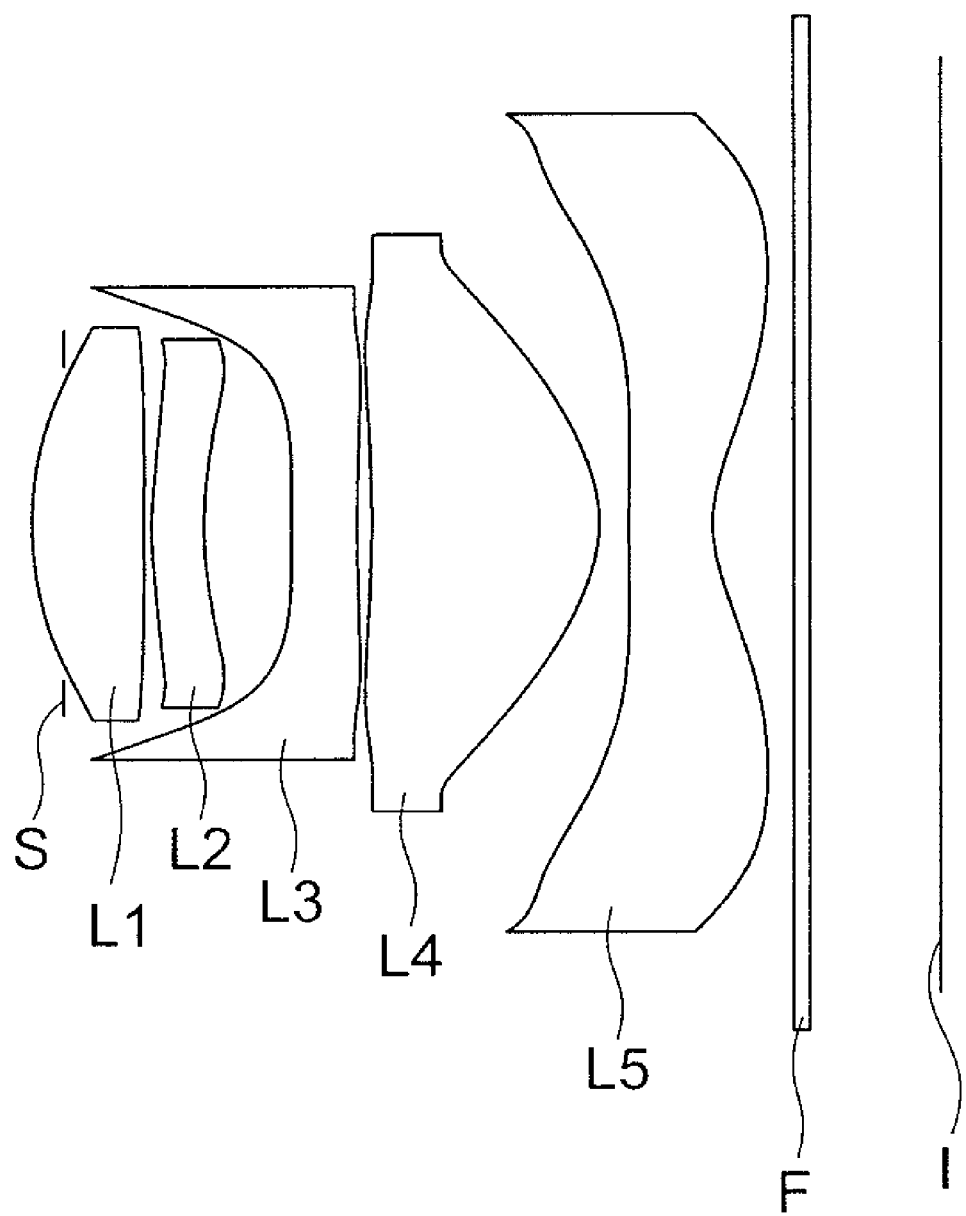
FIG. 14 shows a sectional view of the image pickup lens of Example 6.
Figure 15:
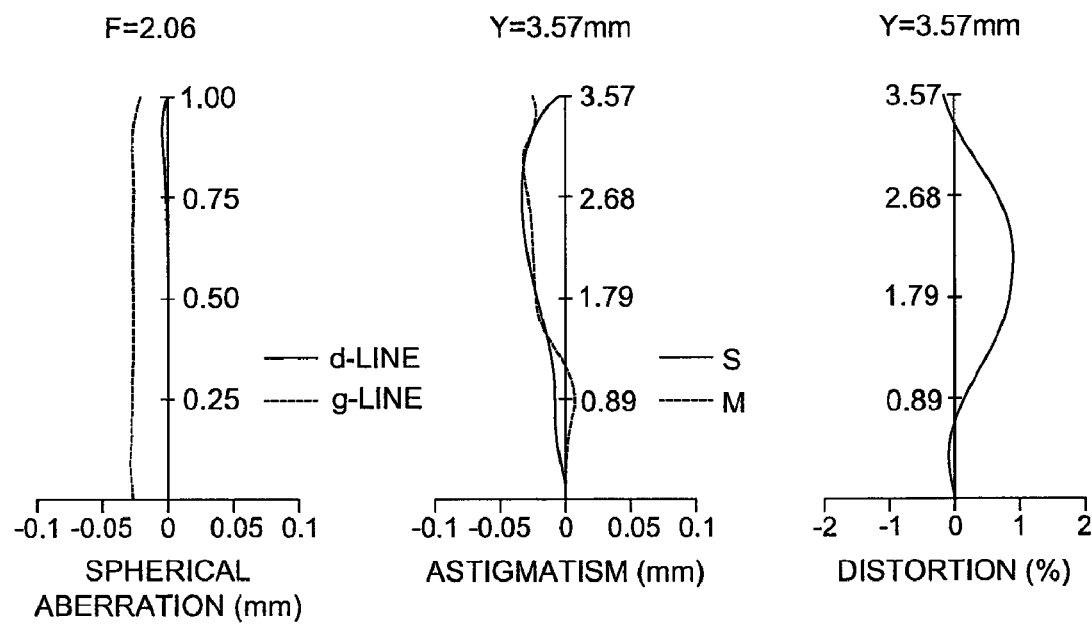
FIG. 15 shows aberration diagrams of the image pickup lens of Example 6 (spherical aberration, astigmatism, distortion, and meridional coma).
Figure 15:
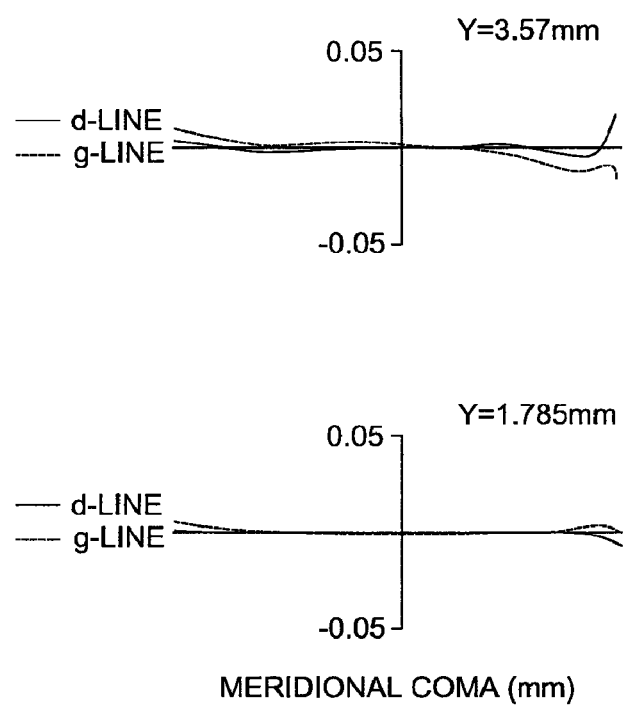

In Example 6, each of lenses is formed of a plastic material.
FIG. 14 shows a sectional view of the image pickup lens of Example 6. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 15 shows aberration diagrams (spherical aberration, astigmatism, distortion, and meridional coma) of the image pickup lens of Example 6.

Example 7

All the specifications of the image pickup lens of Example 7 are listed below.
f=5.68 mm
fB=0.81 mm
F=2.06
2Y=7.140 mm
ENTP=0.83 mm
EXTP=-3.43 mm
H1=-1.11 mm
H2=-4.88 mm Surface data of the image pickup lens of Example 7 are listed below.

| Surface number | r (mm) | d (mm) | Nd | vd | Effective radius (mm) |
|---|---|---|---|---|---|
| 1* | 2.342 | 1.06 | 1.54470 | 56.2 | 1.56 |
| 2* | -58.079 | 0.01 | | | 1.22 |
| 3(Stop) | ∞ | 0.07 | | | 1.22 |
| 4* | 4.677 | 0.39 | 1.63200 | 23.4 | 1.24 |
| 5* | 2.229 | 0.82 | | | 1.26 |
| 6* | -7.860 | 0.40 | 1.63200 | 23.4 | 1.33 |
| 7* | -9.548 | 0.05 | | | 1.64 |
| 8* | -8.402 | 1.85 | 1.54470 | 56.2 | 2.03 |
| 9* | -1.529 | 0.47 | | | 2.44 |
| 10* | -16.141 | 0.56 | 1.54470 | 56.2 | 2.71 |
| 11* | 1.875 | 0.60 | | | 3.24 |
| 12 | ∞ | 0.15 | 1.51630 | 64.1 | 3.56 |
| 13 | ∞ | 0.81 | | | 3.58 |

Aspheric surface coefficients are listed below.
First Surface
  K=0.23047E+00, A4=0.89763E-04, A6=0.17308E-02, A8=-0.16946E-02, A10=0.10607E-02, A12=-0.31325E-03, A14=0.49546E-04, A16=-0.23560E-05
Second Surface
  K=-0.29994E+02, A4=0.98771E-02, A6=0.11567E-02, A8=-0.91467E-03, A10=0.21042E-03, A12=-0.13949E-03, A14=0.57385E-04, A16=-0.20970E-05
Fourth Surface
  K=0.62552E+01, A4=-0.40944E-01, A6=0.16012E-01, A8=-0.90175E-02, A10=0.25719E-02, A12=-0.30065E-03, A14=-0.64825E-04
Fifth Surface
  K=-0.40017E+01, A4=-0.22330E-02, A6=0.12835E-01, A8=-0.94790E-02, A10=0.52031E-02, A12=-0.11520E-02, A14=0.11035E-04
Sixth Surface
  K=0.32000E+02, A4=-0.51804E-01, A6=-0.11134E-01, A8=0.26388E-02, A10=-0.15859E-02, A12=0.41871E-03, A14=0.56801E-03
Seventh Surface
  K=0.23502E+02, A4=-0.27913E-01, A6=-0.18212E-02, A8=-0.46301E-03, A10=0.80285E-03, A12=0.20144E-03, A14=-0.36715E-04

Eighth Surface
  K=−0.13644E+02, A4=0.10267E−01, A6=0.16826E−02, A8=−0.10129E−03, A10=−0.78692E−04, A12=0.57750E−05, A14=−0.10490E−05
Ninth Surface
  K=−0.40404E+01, A4=−0.39458E−01, A6=0.13630E−01, A8=−0.26403E−02, A10=0.35834E−03, A12=−0.14324E−04, A14=−0.17910E−05
Tenth Surface
  K=−0.24851E+02, A4=−0.42443E−01, A6=0.95223E−02, A8=−0.53673E−03, A10=−0.19538E−03, A12=0.37876E−04, A14=−0.20480E−05
Eleventh Surface
  K=−0.80235E+01, A4=−0.31123E−01, A6=0.64172E−02, A8=−0.97433E−03, A10=0.83458E−04, A12=−0.43540E−05, A14=0.11500E−06

Single lens data of the image pickup lens of Example 7 are listed below.

| Lens | Forefront surface | Focal length (mm) |
|---|---|---|
| 1 | 1 | 4.159 |
| 2 | 4 | −7.178 |
| 3 | 6 | −77.440 |
| 4 | 8 | 3.134 |
| 5 | 10 | −3.050 |

Values corresponding to the conditional expressions (1) to (6), and (8) to (10) of the image pickup lens of Example 7 are listed below.
(1) f12/f=1.237
(2) f2/f=−1.263
(3) r4/f=0.392
(4) v1−v2=32.6
(5) n2=1.632
(6) Pair23/P=−2.175
(8) |f3|/f=13.625
(9) d456/f=0.223
(10) L/2Y=1.005

In Example 7, each of lenses is formed of a plastic material.

Figure 16:
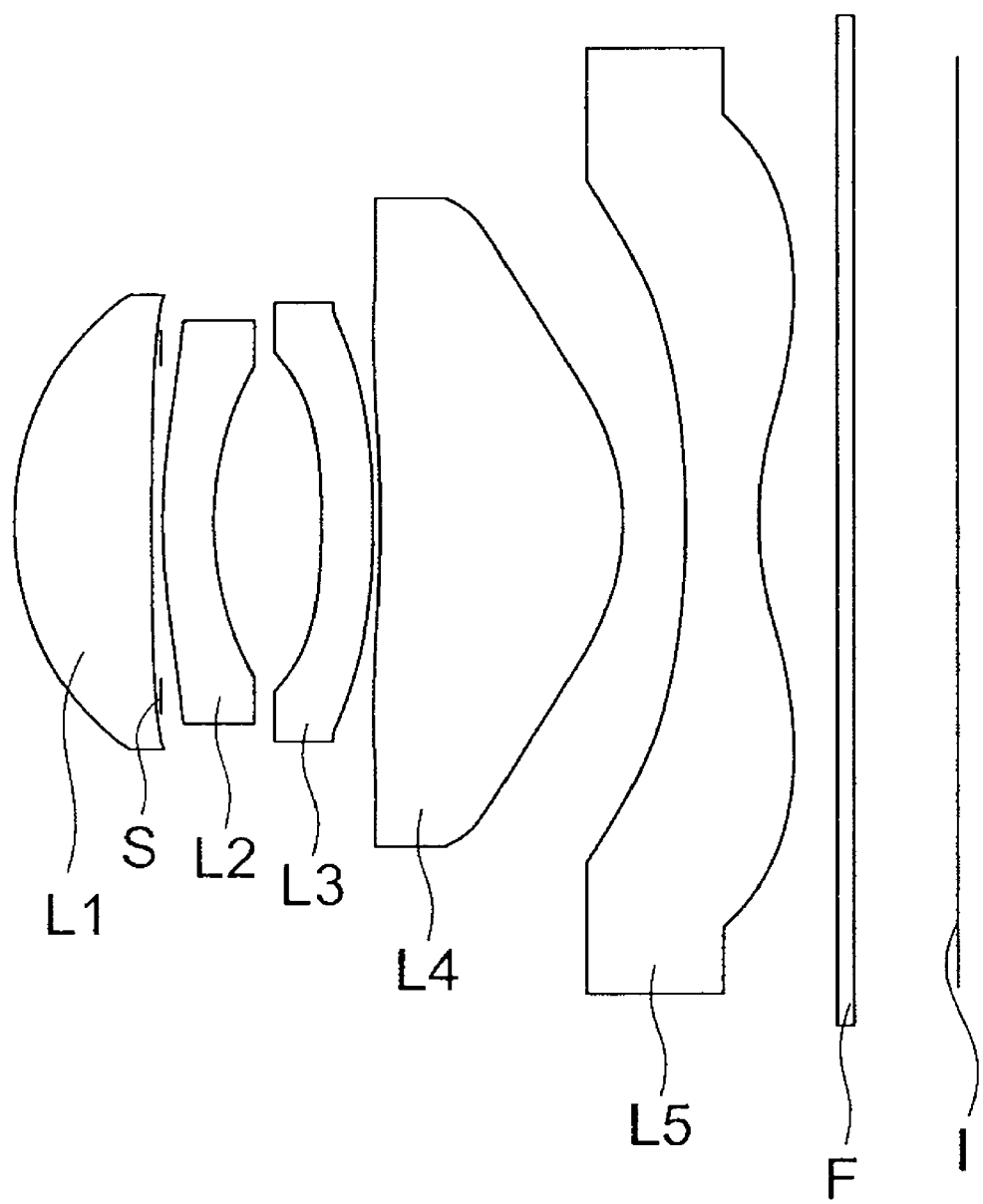
FIG. 16 shows a sectional view of the image pickup lens of Example 7.
Figure 17:
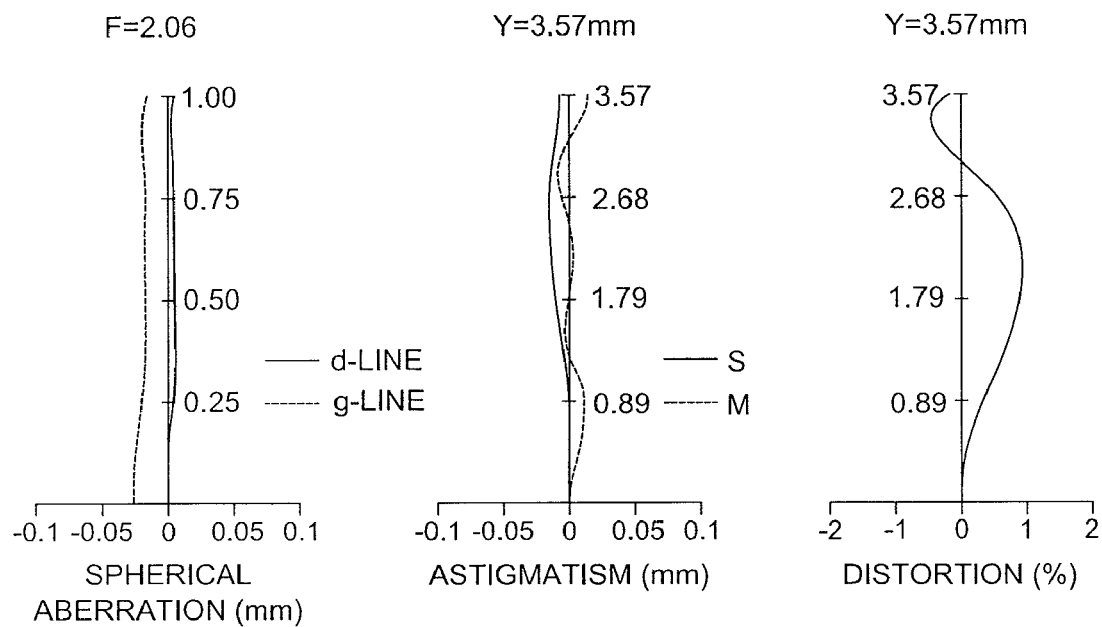
FIG. 17 shows aberration diagrams of the image pickup lens of Example 7 (spherical aberration, astigmatism, distortion, and meridional coma).
Figure 17:
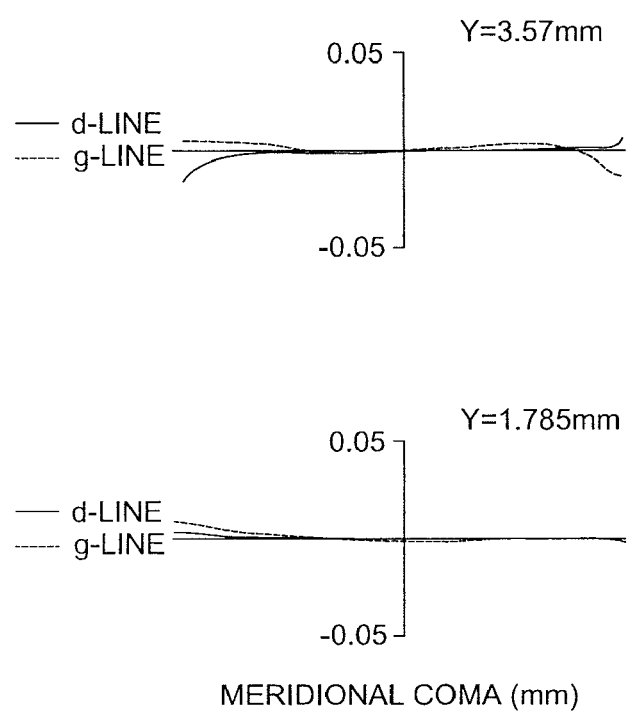

FIG. 16 shows a sectional view of the image pickup lens of Example 7. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 17 shows aberration diagrams (spherical aberration, astigmatism, distortion, and meridional coma) of the image pickup lens of Example 7.

Example 8

All the specifications of the image pickup lens of Example 8 are listed below.
f=5.61 mm
fB=0.70 mm
F=2.06
2Y=7.140 mm
ENTP=0.00 mm
EXTP=−3.60 mm
H1=−1.69 mm
H2=−4.90 mm Surface data of the image pickup lens of Example 8 are listed below.

| Surface number | r (mm) | d (mm) | Nd | vd | Effective radius (mm) |
|---|---|---|---|---|---|
| 1(Stop) | ∞ | −0.30 | | | 1.36 |
| 2* | 2.626 | 0.91 | 1.69350 | 53.2 | 1.38 |
| 3* | 31.430 | 0.10 | | | 1.40 |
| 4* | 5.860 | 0.40 | 1.63200 | 23.4 | 1.39 |
| 5* | 2.534 | 0.78 | | | 1.36 |
| 6* | −8.265 | 0.50 | 1.63200 | 23.4 | 1.50 |
| 7* | −12.646 | 0.35 | | | 1.68 |
| 8* | −49.423 | 1.46 | 1.54470 | 56.2 | 2.18 |
| 9* | −1.777 | 0.45 | | | 2.45 |
| 10* | −9.688 | 0.50 | 1.54470 | 56.2 | 2.67 |
| 11* | 2.176 | 0.60 | | | 3.11 |
| 12 | ∞ | 0.15 | 1.51630 | 64.1 | 3.38 |
| 13 | ∞ | | | | 3.40 |

Aspheric surface coefficients are listed below.
Second Surface
  K=0.15508E+00, A4=−0.87045E−03, A6=0.69963E−03, A8=−0.16953E−02, A10=0.97778E−03, A12=−0.33620E−03, A14=0.36419E−04, A16=−0.61097E−05
Third Surface
  K=0.24933E+02, A4=−0.23260E−02, A6=0.17948E−02, A8=−0.28039E−03, A10=−0.38440E−03, A12=−0.36371E−03, A14=0.15315E−03, A16=−0.23132E−04
Fourth Surface
  K=0.86801E+01, A4=−0.28104E−01, A6=0.17251E−01, A8=−0.76766E−02, A10=0.27746E−02, A12=−0.11333E−02, A14=0.76469E−04
Fifth Surface
  K=−0.36516E+01, A4=0.59919E−02, A6=0.18297E−01, A8=−0.87590E−02, A10=0.67621E−02, A12=−0.14959E−02, A14=−0.18450E−03
Sixth Surface
  K=0.24844E+02, A4=−0.32566E−01, A6=0.26232E−03, A8=0.57545E−02, A10=0.53935E−03, A12=0.73479E−03, A14=−0.29141E−03
Seventh Surface
  K=0.18273E+02, A4=−0.29240E−01, A6=0.49183E−02, A8=0.91335E−03, A10=0.58095E−03, A12=0.80029E−04, A14=−0.55161E−04
Eighth Surface
  K=0.25000E+02, A4=−0.13819E−02, A6=0.13979E−02, A8=0.18682E−03, A10=−0.60174E−04, A12=−0.90736E−06, A14=0.45223E−06
Ninth Surface
  K=−0.56352E+01, A4=−0.31650E−01, A6=0.13922E−01, A8=−0.28640E−02, A10=0.32907E−03, A12=−0.13209E−04, A14=−0.45117E−06
Tenth Surface
  K=0.53311E+01, A4=−0.41119E−01, A6=0.96922E−02, A8=−0.53135E−03, A10=−0.19677E−03, A12=0.37983E−04, A14=−0.19656E−05
Eleventh Surface
  K=−0.11151E+02, A4=−0.32603E−01, A6=0.62546E−02, A8=−0.93502E−03, A10=0.83336E−04, A12=−0.45432E−05, A14=0.11774E−06

Single lens data of the image pickup lens of Example 8 are listed below.

| Lens | Forefront surface | Focal length (mm) |
|---|---|---|
| 1 | 2 | 4.079 |
| 2 | 4 | −7.408 |
| 3 | 6 | −39.498 |
| 4 | 8 | 3.348 |
| 5 | 10 | −3.214 |

Values corresponding to the conditional expressions (1) to (6), and (8) to (10) of the image pickup lens of Example 8 are listed below.
(1) f12/f=1.209
(2) f2/f=−1.322
(3) r4/f=0.452
(4) v1−v2=29.8
(5) n2=1.632
(6) Pair23/P=−1.910
(8) |f3|/f=7.047
(9) d456/f=0.291
(10) L/2Y=0.960

In Example 8, the first lens is formed of a molded glass lens, and each of the second through fifth lenses is formed of a plastic material.

Figure 18:
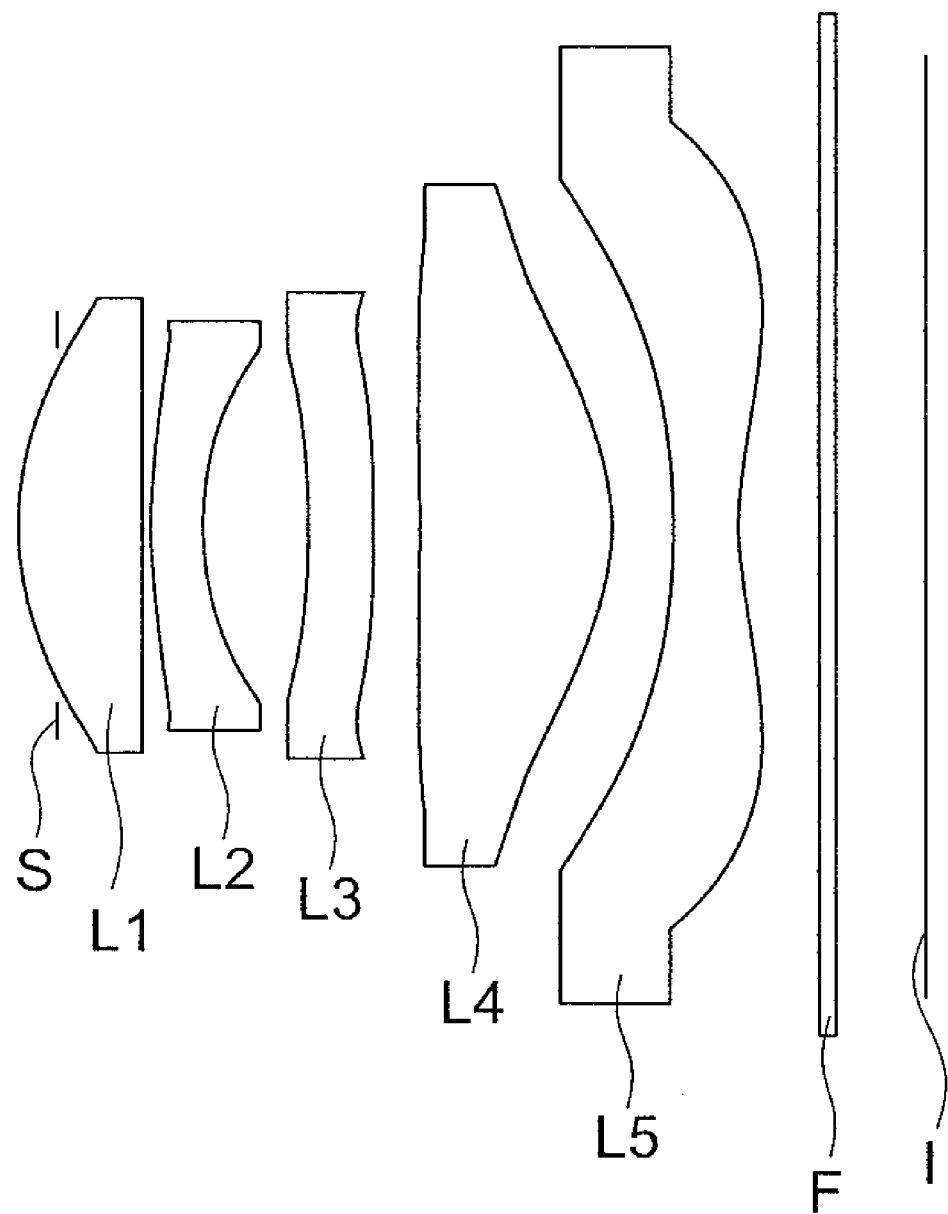
FIG. 18 shows a sectional view of the image pickup lens of Example 8.
Figure 19:
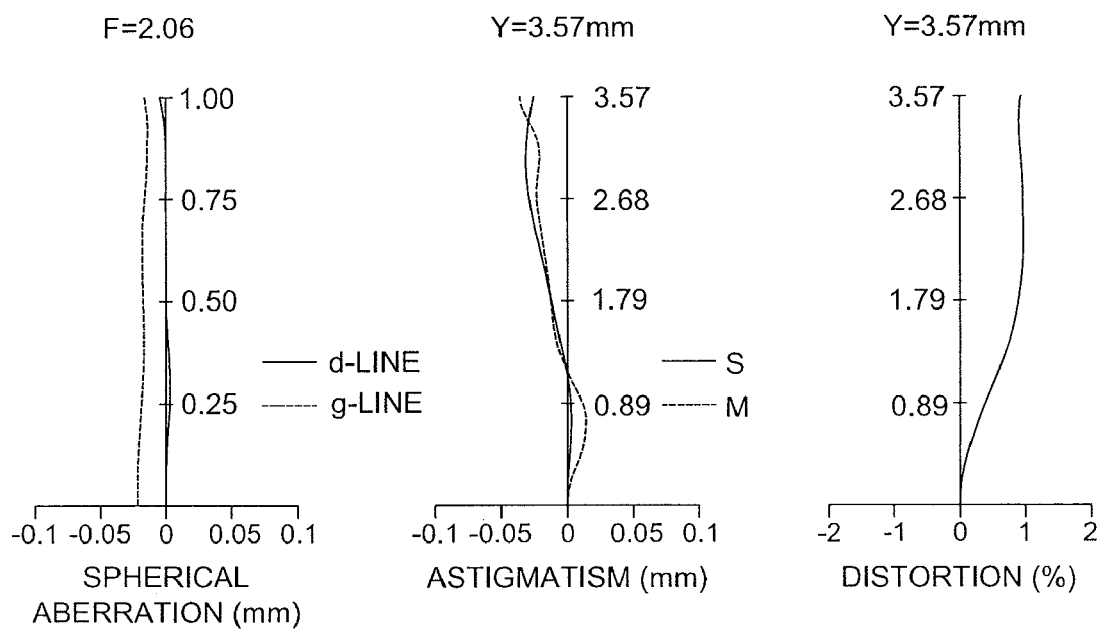
FIG. 19 shows aberration diagrams of the image pickup lens of Example 8 (spherical aberration, astigmatism, distortion, and meridional coma).
Figure 19:
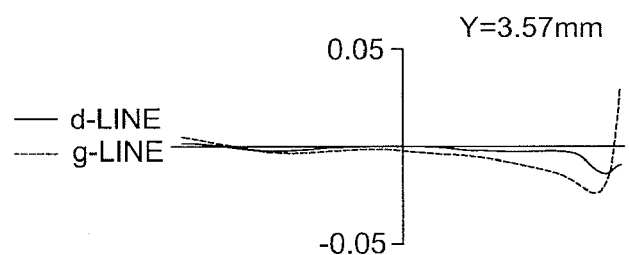
Figure 19:
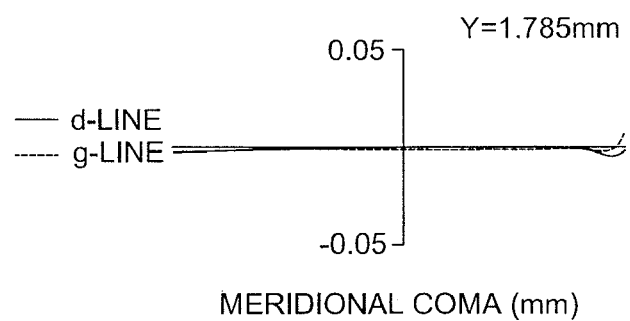

FIG. 18 shows a sectional view of the image pickup lens of Example 8. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 19 shows aberration diagrams (spherical aberration, astigmatism, distortion, and meridional coma) of the image pickup lens of Example 8.

Example 9

All the specifications of the image pickup lens of Example 9 are listed below.
f=3.61 mm
fB=0.39 mm
F=2.06
2Y=4.48 mm
ENTP=0.00 mm
EXTP=−2.30 mm
H1=−1.24 mm
H2=−3.22 mm Surface data of the image pickup lens of Example 9 are listed below.

| Surface number | r (mm) | d (mm) | Nd | vd | Effective radius (mm) |
|---|---|---|---|---|---|
| 1(Stop) | ∞ | −0.14 | | | 0.88 |
| 2* | 1.852 | 0.66 | 1.54470 | 56.2 | 0.89 |
| 3* | −12.167 | 0.12 | | | 0.94 |
| 4* | 3.704 | 0.35 | 1.63200 | 23.4 | 0.98 |
| 5* | 1.569 | 0.40 | | | 0.97 |
| 6* | 4.865 | 0.35 | 1.63200 | 23.4 | 1.05 |
| 7* | 5.427 | 0.23 | | | 1.18 |
| 8* | −96.022 | 1.14 | 1.54470 | 56.2 | 1.34 |
| 9* | −0.884 | 0.13 | | | 1.53 |
| 10* | −18.193 | 0.40 | 1.54470 | 56.2 | 1.68 |
| 11* | 0.826 | 0.40 | | | 2.02 |
| 12 | ∞ | 0.15 | 1.51630 | 64.1 | 2.10 |
| 13 | ∞ | | | | 2.12 |

Aspheric surface coefficients are listed below.
Second Surface
  K=0.10631E−01, A4=−0.10057E−01, A6=0.11933E−01, A8=−0.50449E−01, A10=0.71656E−01, A12=−0.58082E−01, A14=0.17190E−01
Third Surface
  K=0.30000E+02, A4=−0.18368E−01, A6=0.81203E−01, A8=−0.99672E−01, A10=0.11165E−01, A12=0.54838E−01, A14=−0.31170E−01
Fourth Surface
  K=0.81380E+01, A4=−0.14141E+00, A6=0.22888E+00, A8=−0.26223E+00, A10=0.14821E+00, A12=−0.38855E−01, A14=0.59288E−02
Fifth Surface
  K=−0.49618E+01, A4=−0.16074E−01, A6=0.17837E+00, A8=−0.25983E+00, A10=0.33521E+00, A12=−0.29218E+00, A14=0.11473E+00
Sixth Surface
  K=0.98544E+00, A4=−0.12169E+00, A6=0.43174E−02, A8=0.51214E−01, A10=−0.23021E−02, A12=0.13907E−01, A14=−0.20352E−01
Seventh Surface
  K=0.12055E+02, A4=−0.76270E−01, A6=0.21440E−01, A8=−0.88727E−01, A10=0.13836E+00, A12=−0.58141E−01, A14=0.46039E−02
Eighth Surface
  K=0.30000E+02, A4=0.31981E−01, A6=−0.12836E−01, A8=−0.22187E−01, A10=0.66583E−02, A12=0.66984E−02, A14=−0.21987E−02
Ninth Surface
  K=−0.49531E+01, A4=−0.10167E+00, A6=0.10512E+00, A8=−0.56999E−01, A10=0.17059E−01, A12=−0.51067E−02, A14=0.10718E−02
Tenth Surface
  K=−0.20682E+02, A4=−0.17526E+00, A6=0.94906E−01, A8=−0.12382E−01, A10=−0.12609E−01, A12=0.60013E−02, A14=−0.76036E−03
Eleventh Surface
  K=−0.62341E+01, A4=−0.11891E+00, A6=0.62455E−01, A8=−0.23532E−01, A10=0.54495E−02, A12=−0.72881E−03, A14=0.43268E−04

Single lens data of the image pickup lens of Example 9 are listed below.

| Lens | Forefront surface | Focal length (mm) |
|---|---|---|
| 1 | 2 | 3.000 |
| 2 | 4 | −4.601 |
| 3 | 6 | 59.925 |
| 4 | 8 | 1.631 |
| 5 | 10 | −1.440 |

Values corresponding to the conditional expressions (1) to (6), and (8) to (10) of the image pickup lens of Example 9 are listed below.
(1) f12/f=1.534
(2) f2/f=−1.276
(3) r4/f=0.435
(4) v1−v2=32.6
(5) n2=1.632
(6) Pair23/P=−0.909
(8) |f3|/f=16.613
(9) d456/f=0.271
(10) L/2Y=1.040

In Example 9, the first lens is formed of a molded glass lens, and each of the second through fifth lenses is formed of a plastic material.

Figure 20:
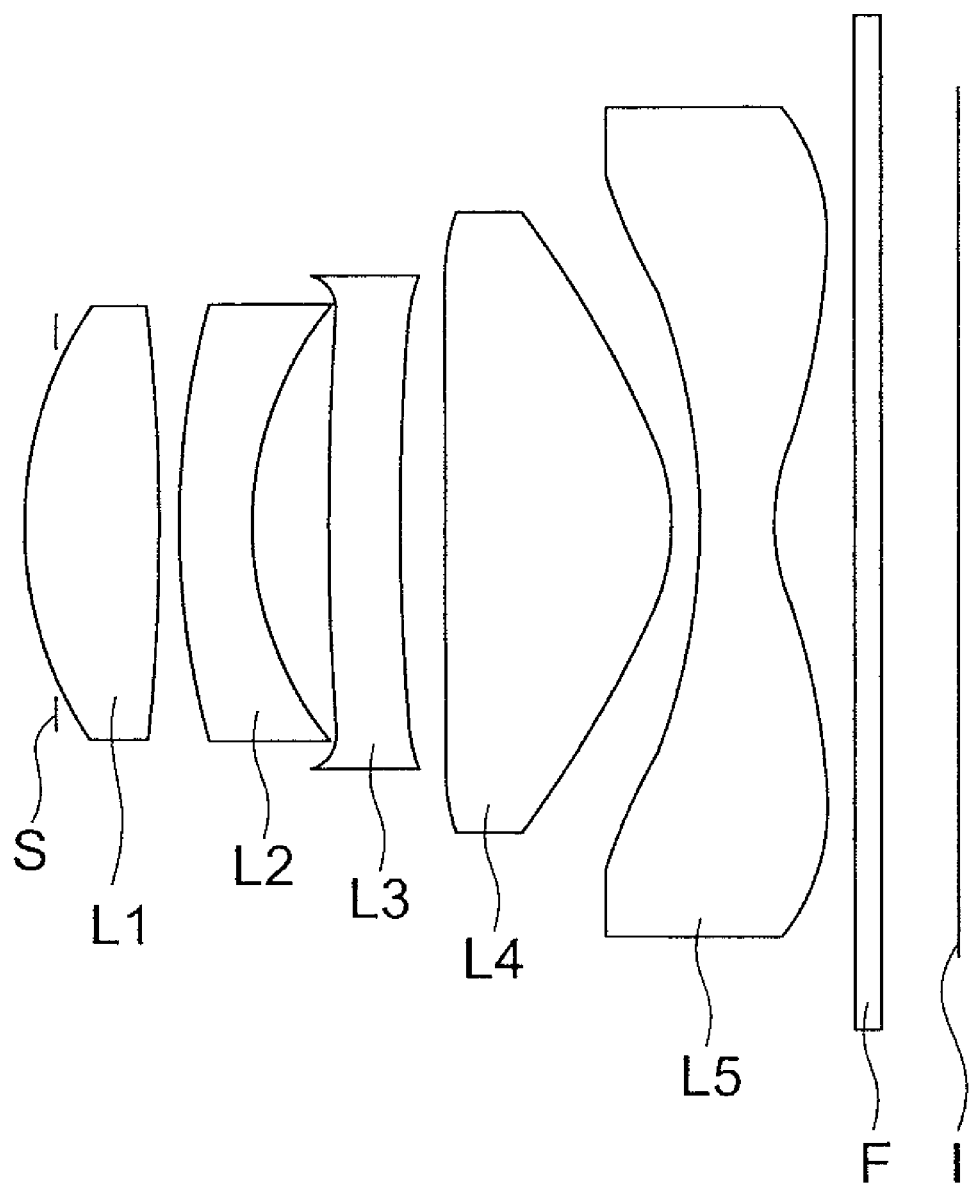
FIG. 20 shows a sectional view of the image pickup lens of Example 9.
Figure 21:
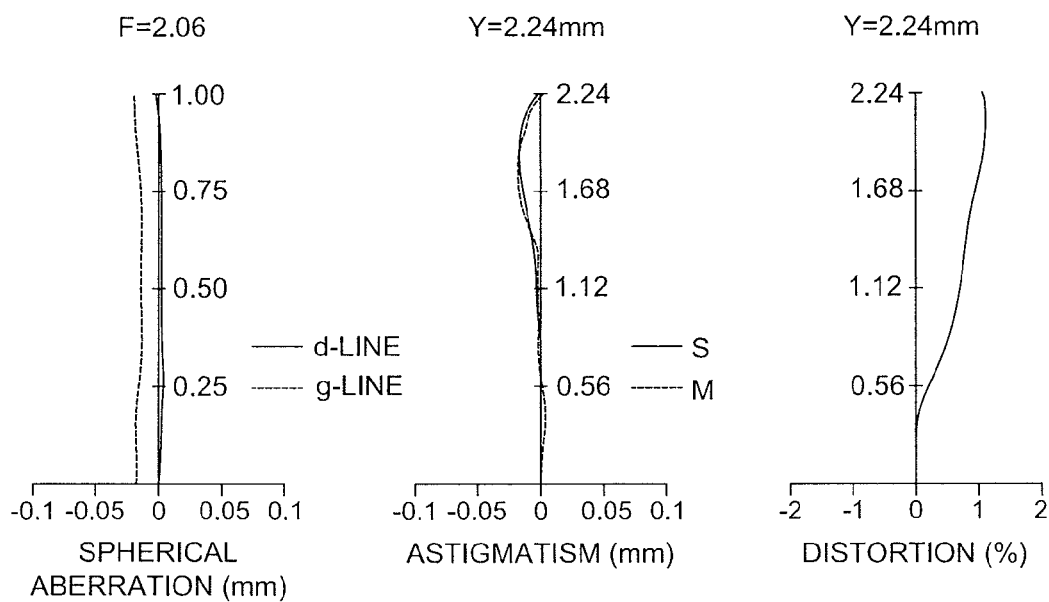
FIG. 21 shows aberration diagrams of the image pickup lens of Example 9 (spherical aberration, astigmatism, distortion, and meridional coma).
Figure 21:
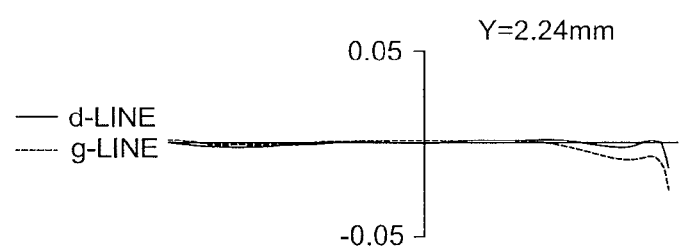
Figure 21:
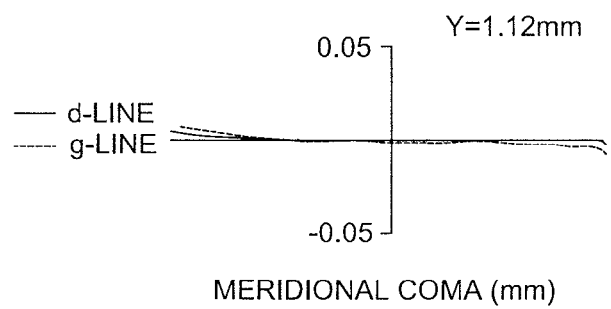

FIG. 20 shows a sectional view of the image pickup lens of Example 9. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 21 shows aberration diagrams (spherical aberration, astigmatism, distortion, and meridional coma) of the image pickup lens of Example 9.

Example 10

All the specifications of the image pickup lens of Example 10 are listed below.
f=3.62 mm
fB=0.62 mm
F=2.06
2Y=4.50 mm
ENTP=0.00 mm
EXTP=−1.95 mm
H1=−1.49 mm
H2=−3.01 mm Surface data of the image pickup lens of Example 10 are listed below.

| Surface number | r (mm) | d (mm) | Nd | νd | Effective radius (mm) |
|---|---|---|---|---|---|
| 1(Stop) | ∞ | −0.30 | | | 0.88 |
| 2* | 1.511 | 0.70 | 1.54470 | 56.2 | 0.88 |
| 3* | −10.723 | 0.05 | | | 0.90 |
| 4* | 4.941 | 0.35 | 1.63200 | 23.4 | 0.90 |
| 5* | 1.535 | 0.41 | | | 0.90 |
| 6* | −7.026 | 0.35 | 1.58300 | 30.0 | 1.00 |
| 7* | −14.330 | 0.05 | | | 1.10 |
| 8* | −49.611 | 1.03 | 1.54470 | 56.2 | 1.20 |
| 9* | −1.003 | 0.27 | | | 1.50 |
| 10* | −3.260 | 0.40 | 1.54470 | 56.2 | 1.70 |
| 11* | 1.387 | 0.16 | | | 2.00 |
| 12 | ∞ | 0.15 | 1.51680 | 64.2 | 2.40 |
| 13 | ∞ | | | | 2.40 |

Aspheric surface coefficients are listed below.
Second Surface
  K=0.26408E+00, A4=0.29716E−02, A6=0.14665E−01, A8=−0.35400E−01, A10=0.74560E−01, A12=−0.49028E−01, A14=0.18846E−01
Third Surface
  K=−0.30000E+02, A4=0.57582E−01, A6=0.55984E−02, A8=0.29750E−01, A10=−0.87303E−02, A12=−0.66251E−01, A14=0.31630E−01
Fourth Surface
  K=0.10000E+02, A4=−0.10739E+00, A6=0.15115E+00, A8=−0.20859E+00, A10=0.17872E+00, A12=−0.17956E+00, A14=0.10637E−01
Fifth Surface
  K=−0.43515E+01, A4=−0.14707E−01, A6=0.17275E+00, A8=−0.20691E+00, A10=0.34057E+00, A12=−0.31457E+00, A14=0.10537E+00
Sixth Surface
  K=0.29405E+02, A4=−0.12377E+00, A6=−0.13716E−01, A8=0.15016E+00, A10=0.62940E−01, A12=0.65542E−01, A14=−0.12521E+00
Seventh Surface
  K=0.30000E+02, A4=−0.89231E−01, A6=−0.49504E−02, A8=0.52767E−01, A10=0.35405E−01, A12=−0.80319E−03, A14=−0.17326E−01
Eighth Surface
  K=−0.20000E+02, A4=−0.65194E−02, A6=0.63353E−02, A8=0.11005E−01, A10=0.17189E−02, A12=−0.14236E−02, A14=−0.22780E−02
Ninth Surface
  K=−0.44340E+01, A4=−0.14296E+00, A6=0.15642E+00, A8=−0.72174E−01, A10=0.22527E−01, A12=−0.19585E−02, A14=−0.81916E−03
Tenth Surface
  K=0.78130E+00, A4=−0.12832E+00, A6=0.11001E+00, A8=−0.14964E−01, A10=−0.12910E−01, A12=0.60002E−02, A14=−0.77936E−03
Eleventh Surface
  K=−0.11461E+02, A4=−0.13068E+00, A6=0.70515E−01, A8=−0.24317E−01, A10=0.51457E−02, A12=−0.72477E−03, A14=0.52668E−04

Single lens data of the image pickup lens of Example 10 are listed below.

| Lens | Forefront surface | Focal length (mm) |
|---|---|---|
| 1 | 2 | 2.482 |
| 2 | 4 | −3.671 |
| 3 | 6 | −24.067 |
| 4 | 8 | 1.866 |
| 5 | 10 | −1.734 |

Values corresponding to the conditional expressions (1) to (6), and (8) to (10) of the image pickup lens of Example 10 are listed below.
(1) f12/f=1.277
(2) f2/f=−1.013
(3) r4/f=0.424
(4) ν1−ν2=32.6
(5) n2=1.632
(6) Pair23/P=−1.843
(8) |f3|/f=6.640
(9) d456/f=0.223
(10) L/2Y=1.001

In Example 10, the first lens is formed of a molded glass lens, and each of the second through fifth lenses is formed of a plastic material.

Figure 22:
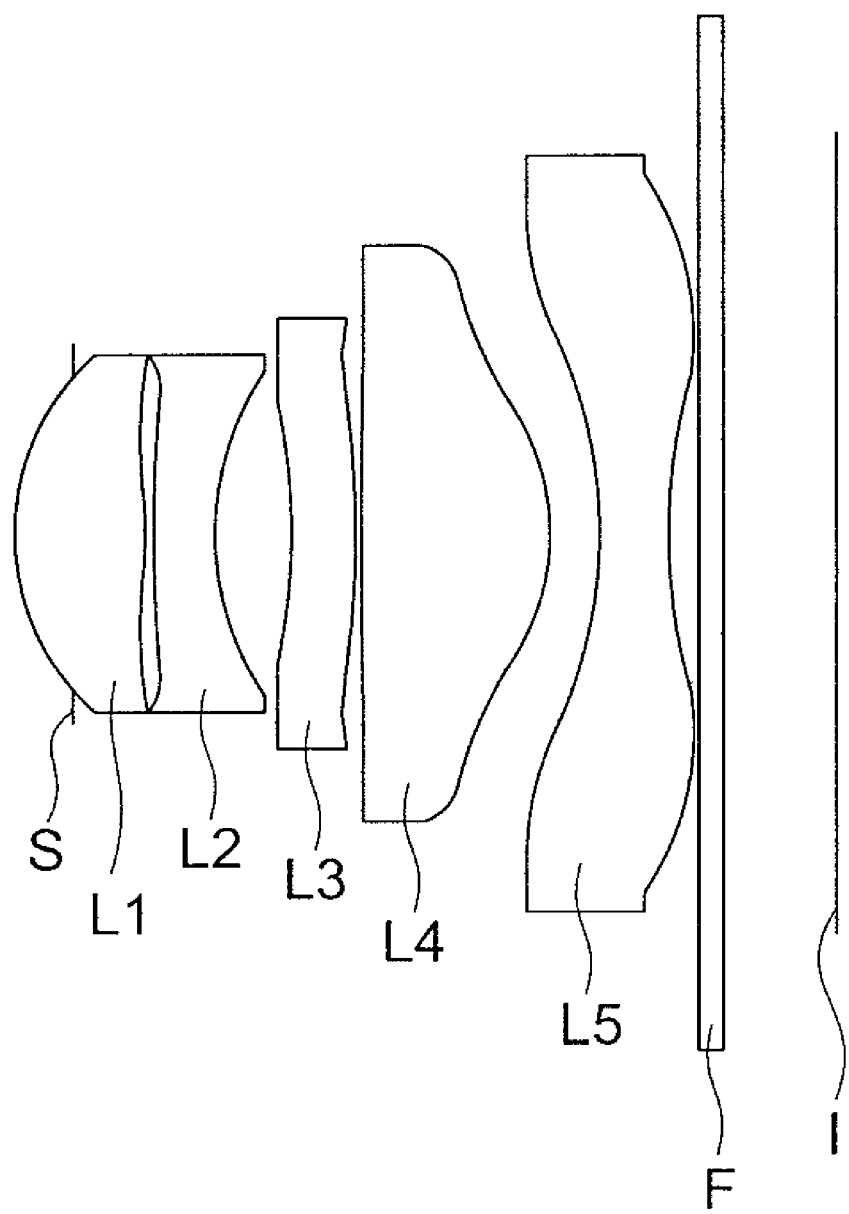
FIG. 22 shows a sectional view of the image pickup lens of Example 10.
Figure 23:
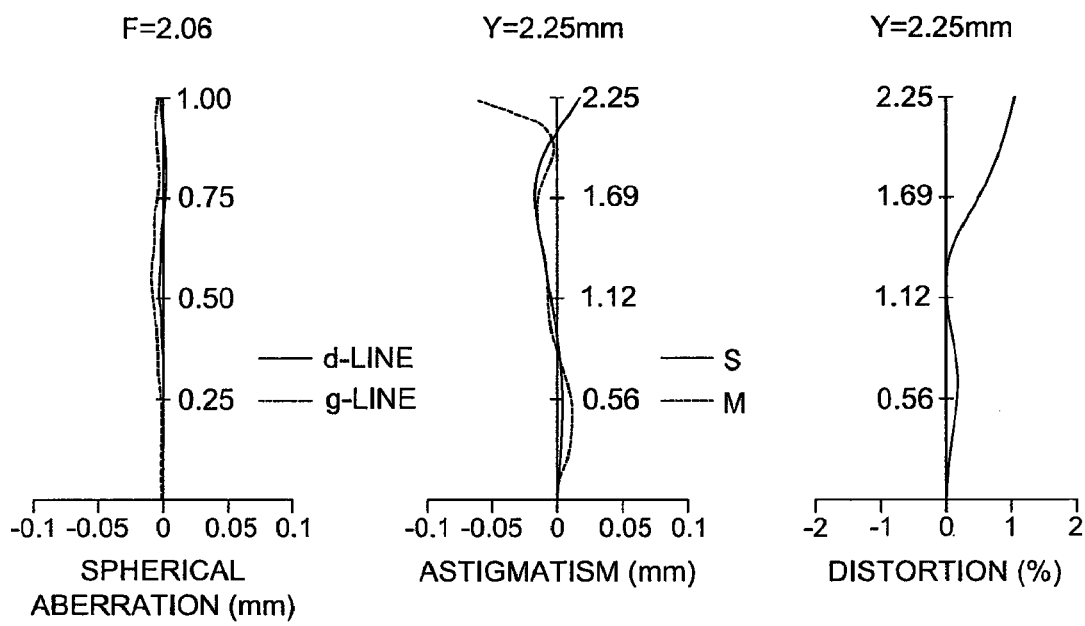
FIG. 23 shows aberration diagrams of the image pickup lens of Example 10 (spherical aberration, astigmatism, distortion, and meridional coma).
Figure 23:
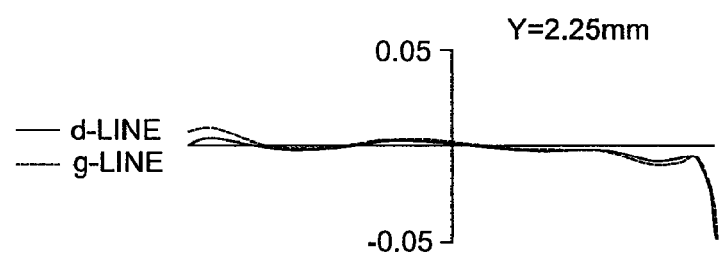
Figure 23:
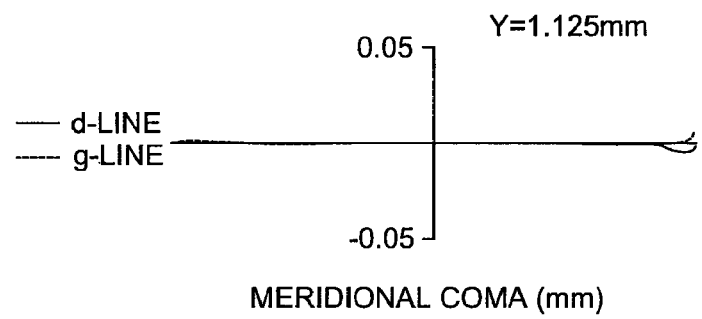

FIG. 22 shows a sectional view of the image pickup lens of Example 10. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 23 shows aberration diagrams (spherical aberration, astigmatism, distortion, and meridional coma) of the image pickup lens of Example 10.

Example 11

All the specifications of the image pickup lens of Example 11 are listed below.
f=4.60 mm
fB=0.40 mm
F=2.88

2Y=7.14 mm
ENTP=0.00 mm
EXTP=−3.07 mm
H1=−1.50 mm
H2=−4.20 mm

Surface data of the image pickup lens of Example 11 are listed below.

| Surface number | r (mm) | d (mm) | Nd | vd | Effective radius (mm) |
|---|---|---|---|---|---|
| 1(Stop) | ∞ | 0.0 | 0 | | 0.80 |
| 2* | 2.445 | 0.78 | 1.54470 | 56.2 | 0.92 |
| 3* | −11.409 | 0.07 | | | 1.04 |
| 4* | 6.184 | 0.35 | 1.63200 | 23.4 | 1.10 |
| 5* | 2.064 | 0.44 | | | 1.19 |
| 6* | 16.514 | 0.58 | 1.54470 | 56.2 | 1.38 |
| 7* | −40.318 | 0.33 | | | 1.54 |
| 8* | −22.031 | 1.09 | 1.54470 | 56.2 | 1.91 |
| 9* | −1.738 | 0.73 | | | 2.08 |
| 10* | −16.209 | 0.50 | 1.54470 | 56.2 | 2.47 |
| 11* | 1.750 | 0.60 | | | 3.09 |
| 12 | ∞ | 0.15 | 1.51630 | 64.1 | 3.34 |
| 13 | ∞ | | | | 3.39 |

Aspheric surface coefficients are listed below.
Second Surface
K=0.34852E+00, A4=0.95169 E−03, A6=0.45053E−03, A8=−0.14078E−02, A10=0.11006E−02, A12=0.25515E−03, A14=0.17386E−02
Third Surface
K=−0.30000E+02, A4=0.27328E−01, A6=0.11966 E−02, A8=0.29100 E−02, A10=0.21339E−02, A12=0.42425E−03, A14=−0.45296E−03
Fourth Surface
K=0.39989E+01, A4=−0.43443E−01, A6=0.25867E−01, A8=−0.38316E−02, A10=0.36971E−02, A12=−0.16886E−02, A14=−0.76694E−03
Fifth Surface
K=−0.53885E+01, A4=−0.29279E−02, A6=0.18318E−01, A8=−0.83248E−02, A10=0.56376E−02, A12=−0.20547E−02, A14=0.39571E−04
Sixth Surface
K=0.30000E+02, A4=−0.26312E−01, A6=0.20648E−02, A8=0.51607E−02, A10=0.67073E−03, A12=0.22844E−03, A14=−0.23941E−03
Seventh Surface
K=0.30000E+02, A4=−0.26519E−01, A6=−0.77065E−03, A8=0.19234E−02, A10=0.86691E−03, A12=0.13548E−03, A14=−0.67858E−04
Eighth Surface
K=−0.29838E+02, A4=0.78863E−03, A6=0.14268E−02, A8=0.66303E−03, A10=−0.30077E−04, A12=−0.18786E−04, A14=−0.11717E−05
Ninth Surface
K=−0.46460E+01, A4=−0.29285E−01, A6=0.16408E−01, A8=−0.27466E−02, A10=0.34675E−03, A12=−0.14412E−04, A14=−0.25625E−05
Tenth Surface
K=0.16766E+02, A4=−0.48178E−01, A6=0.95145E−02, A8=−0.47897E−03, A10=−0.17233E−03, A12=0.39375E−04, A14=−0.23703E−05
Eleventh Surface
K=−0.62315E+01, A4=−0.29266E−01, A6=0.59213E−02, A8=−0.91132E−03, A10=0.85007E−04, A12=−0.47477E−05, A14=0.12725E−06

Single lens data of the image pickup lens of Example 11 are listed below.

| Lens | Forefront surface | Focal length (mm) |
|---|---|---|
| 1 | 2 | 3.772 |
| 2 | 4 | −5.070 |
| 3 | 6 | 21.586 |
| 4 | 8 | 3.401 |
| 5 | 10 | −2.871 |

Values corresponding to the conditional expressions (1) to (6), and (8) to (10) of the image pickup lens of Example 11 are listed below.
(1) f12/f=1.950
(2) f2/f=−1.101
(3) r4/f=0.448
(4) v1−v2=32.6
(5) n2=1.632
(8) Pair23/P=−1.238
(9) |f3|/f=4.688
(10) d456/f=0.293
(9) L/2Y=0.836

In Example 11, the first lens is formed of a molded glass lens, and each of the second through fifth lenses is formed of a plastic material.

Figure 24:
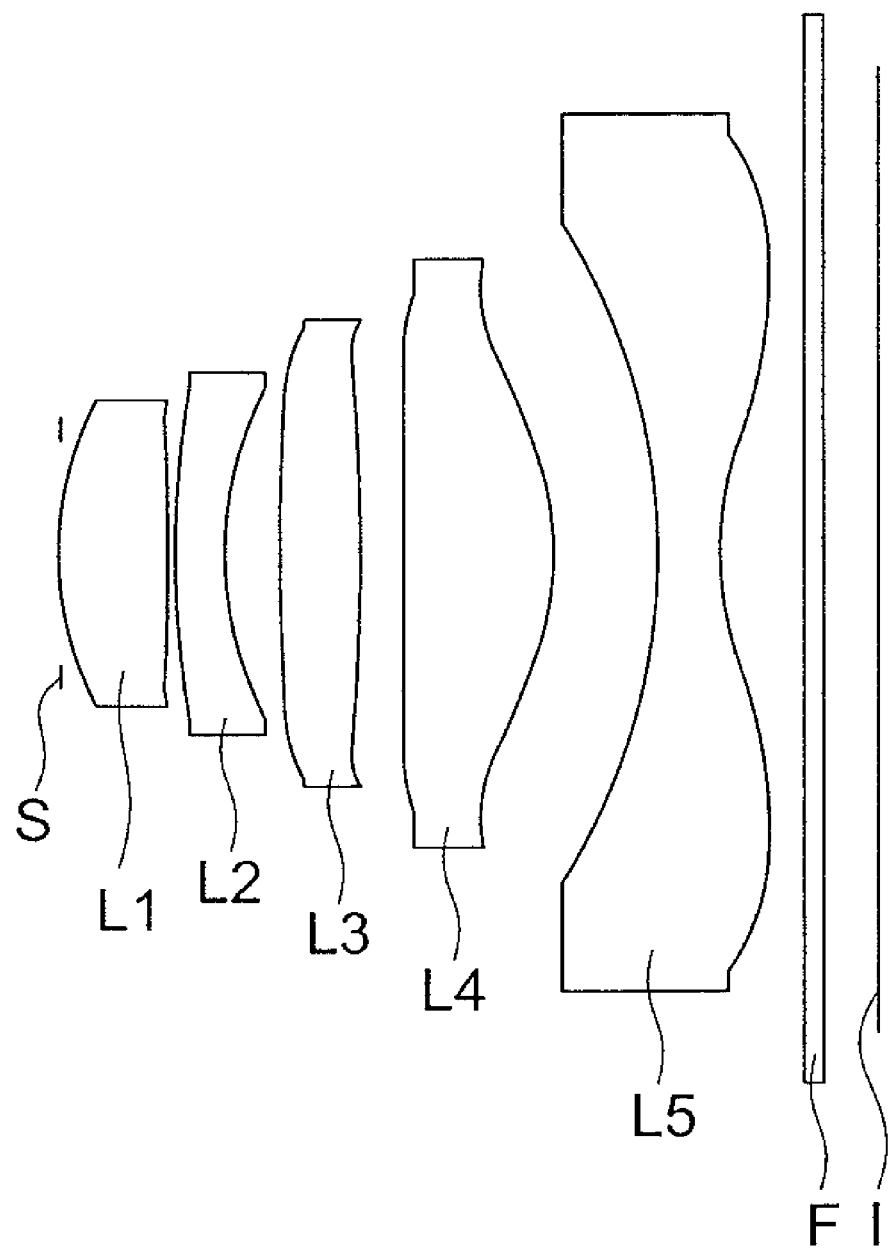
FIG. 24 shows a sectional view of the image pickup lens of Example 11.
Figure 25:
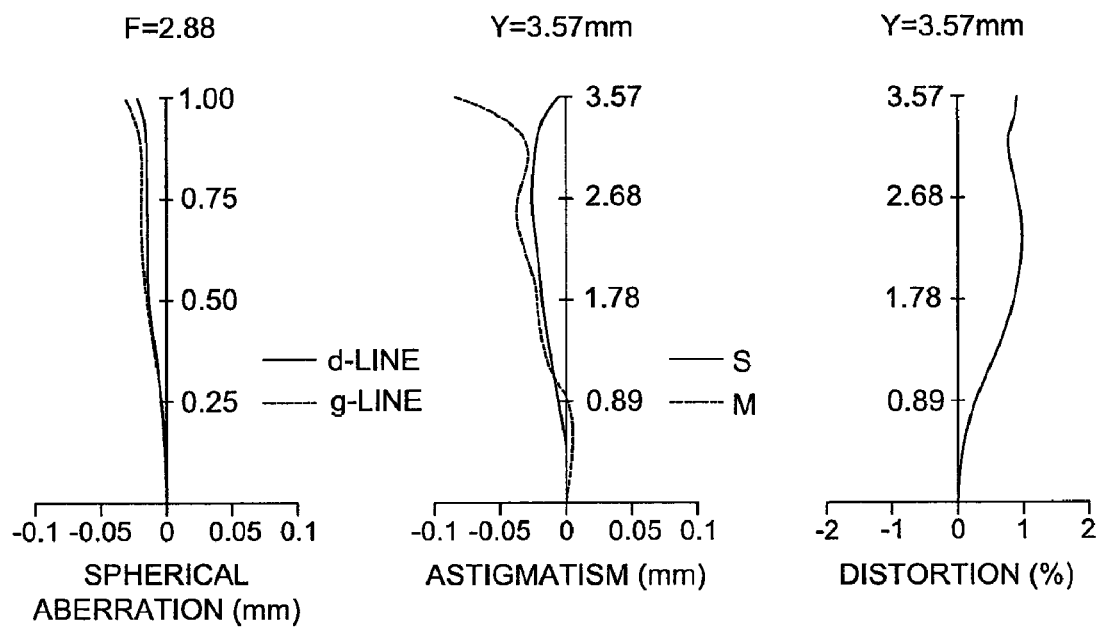
FIG. 25 shows aberration diagrams of the image pickup lens of Example 11 (spherical aberration, astigmatism, distortion, and meridional coma).
Figure 25:
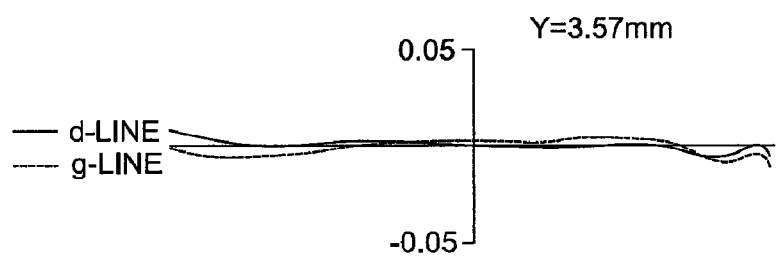
Figure 25:
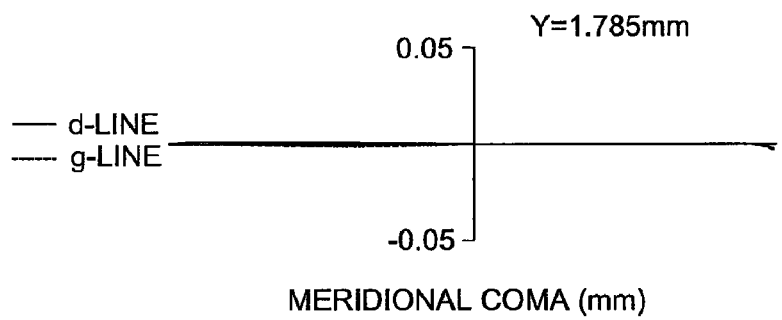

FIG. 24 shows a sectional view of the image pickup lens of Example 11. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 25 shows aberration diagrams (spherical aberration, astigmatism, distortion, and meridional coma) of the image pickup lens of Example 11.

Example 12

All the specifications of the image pickup lens of Example 12 are listed below.
f=5.03 mm
fB=0.37 mm
F=2.88
2Y=7.016 mm
ENTP=0.64 mm
EXTP=−3.04 mm
H1=−1.77 mm
H2=−4.66 mm Surface data of the image pickup lens of Example 12 are listed below.

| Surface number | r (mm) | d (mm) | Nd | vd | Effective radius (mm) |
|---|---|---|---|---|---|
| 1 | ∞ | 0.00 | | | 1.39 |
| 2* | 2.076 | 0.74 | 1.62260 | 58.2 | 1.14 |
| 3* | 9.861 | 0.08 | | | 0.84 |
| 4 (Stop) | ∞ | 0.07 | | | 0.76 |
| 5* | 3.580 | 0.32 | 2.00170 | 19.3 | 0.80 |
| 6* | 2.302 | 0.49 | | | 0.84 |
| 7* | −4.977 | 0.68 | 1.54470 | 56.2 | 1.07 |
| 8* | −2.512 | 0.76 | | | 1.33 |
| 9* | −2.866 | 0.87 | 1.54470 | 56.2 | 1.74 |
| 10* | −1.150 | 0.32 | | | 2.04 |
| 11* | −2.863 | 0.45 | 1.54470 | 56.2 | 2.61 |
| 12 | 2.052 | 0.60 | | | 3.04 |

-continued

| Surface number | r (mm) | d (mm) | Nd | vd | Effective radius (mm) |
|---|---|---|---|---|---|
| 13 | ∞ | 0.30 | 1.51630 | 64.1 | 3.44 |
| 14 | ∞ | | | | 3.51 |

Aspheric surface coefficients are listed below.
Second Surface
 K=0.17081E+00, A4=0.57736E-03, A6=0.11941E-02, A8=-0.21949E-03, A10=-0.40061E-03, A12=0.13228E-02, A14=-0.64952E-03
Third Surface
 K=-0.30000E+02, A4=-0.19978E-01, A6=0.35103E-01, A8=-0.29652E-01, A10=0.15784E-01, A12=-0.14700E-02, A14=-0.42152E-02
Fifth Surface
 K=-0.10189E+02, A4=-0.21921E-01, A6=0.44111E-01, A8=-0.49675E-01, A10=0.41320E-01, A12=-0.14420E-01, A14=-0.70668E-02
Sixth Surface
 K=-0.29336E+01, A4=0.68393E-03, A6=0.39910 E-01, A8=-0.20513E-01, A10=0.11484E-01, A12=0.80308E-02, A14=-0.12193E-01
Seventh Surface
 K=0.16240E+02, A4=-0.24158E-01, A6=0.90376E-02, A8=0.29408E-02, A10=0.93887E-02, A12=0.39989E-02, A14=0.25658E-02
Eighth Surface
 K=0.83881E+00, A4=-0.19966E-01, A6=0.83970E-02, A8=-0.56282E-02, A10=0.25793E-02, A12=-0.55828E-05, A14=0.46892E-03
Ninth Surface
 K=0.64207E-01, A4=-0.40683E-01, A6=0.23565E-01, A8=-0.48901E-02, A10=-0.44936E-03, A12=0.55284E-03, A14=-0.84814E-04
Tenth Surface
 K=-0.32016E+01, A4=-0.49758E-01, A6=0.14552E-01, A8=-0.14208E-02, A10=0.25295E-03, A12=-0.28664E-04, A14=-0.10014E-05

Single lens data of the image pickup lens of Example 12 are listed below.

| Lens | Forefront surface | Focal length (mm) |
|---|---|---|
| 1 | 2 | 4.074 |
| 2 | 4 | -7.369 |
| 3 | 6 | 8.489 |
| 4 | 8 | 2.992 |
| 5 | 10 | -2.126 |

Values corresponding to the conditional expressions (1) to (6), and (8) to (10) of the image pickup lens of Example 12 are listed below.
(1) f12/f=1.32
(2) f2/f=-1.47
(3) r4/f=0.46
(4) v1-v2=38.8
(5) n2=2.002
(6) Pair23/P=-2.86
(8) |f3|/f=1.69
(9) d456/f=0.38
(10) L/2Y=0.85

In Example 12, each of the first lens and the second lens is formed of a molded glass lens, and each of the third through fifth lenses is formed of a plastic material.

Figure 26:
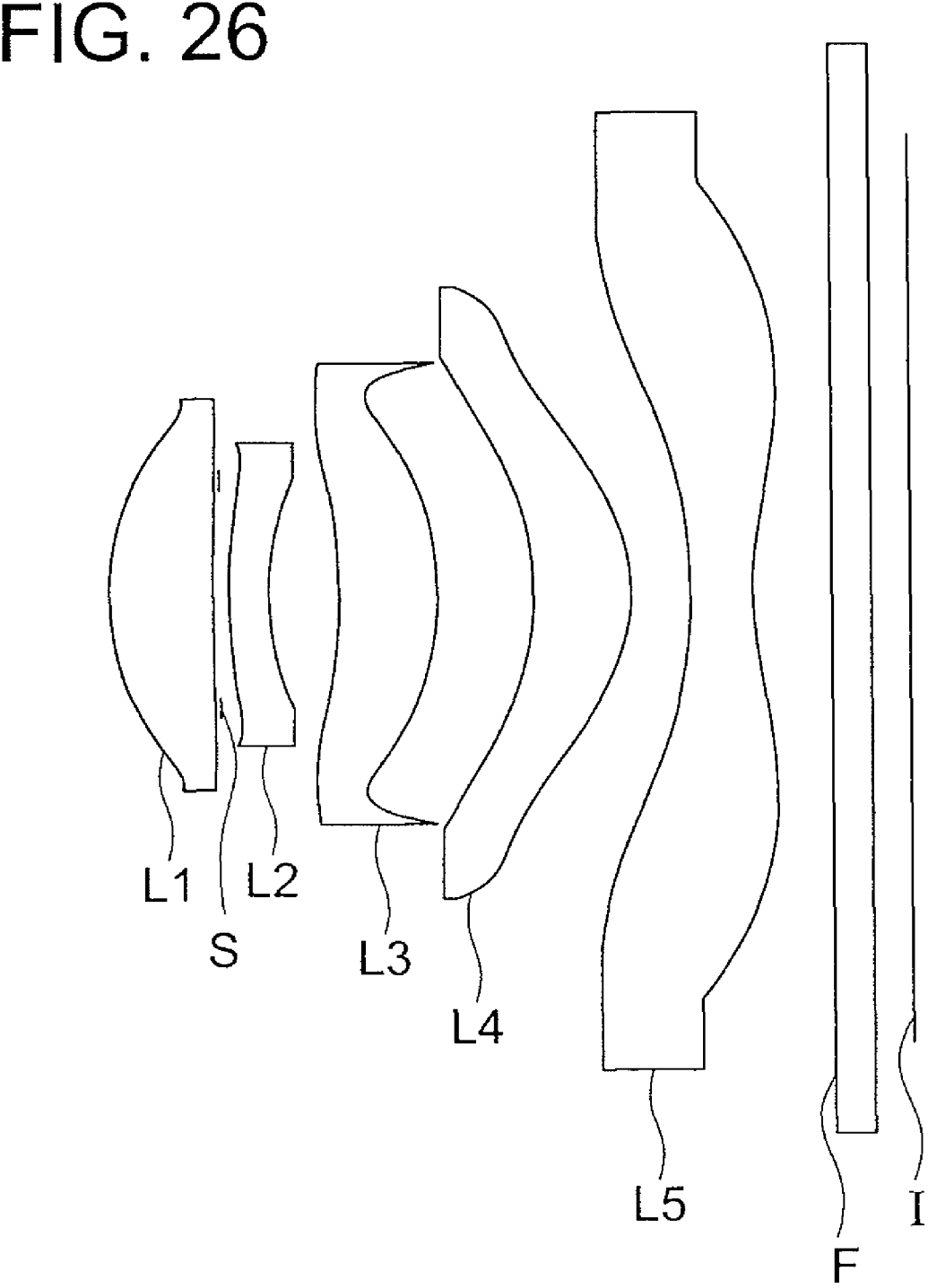
FIG. 26 shows a sectional view of the image pickup lens of Example 12.
Figure 27:
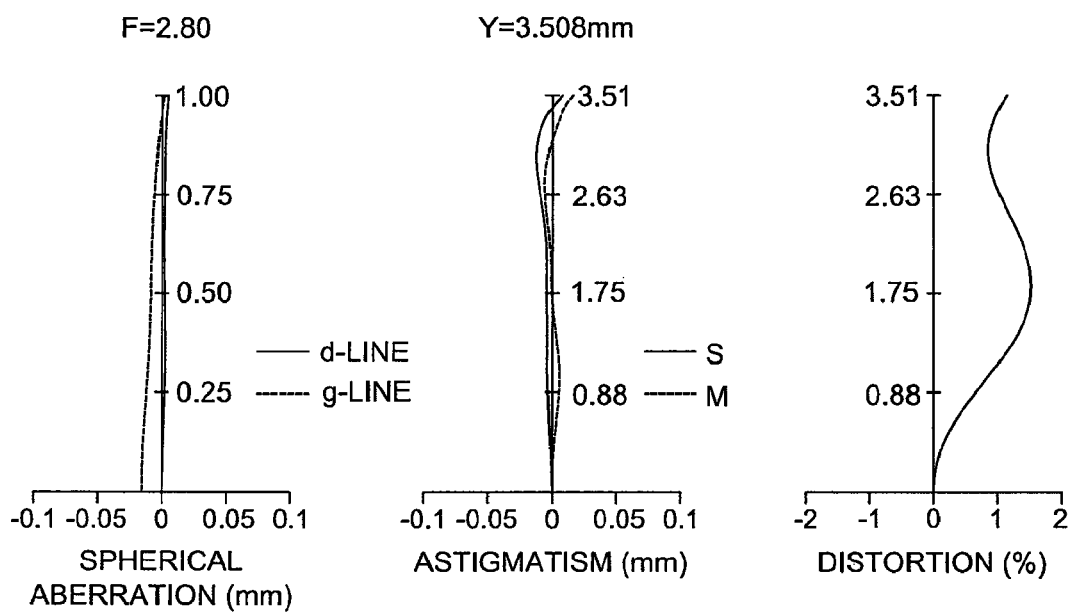
FIG. 27 shows aberration diagrams of the image pickup lens of Example 12 (spherical aberration, astigmatism, distortion, and meridional coma).
Figure 27:
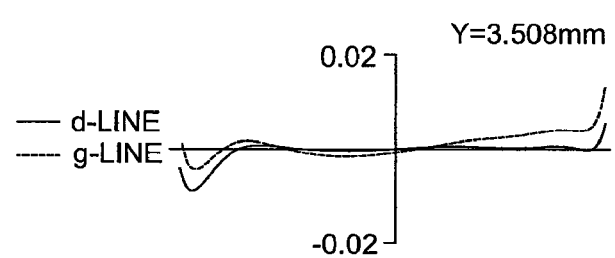
Figure 27:
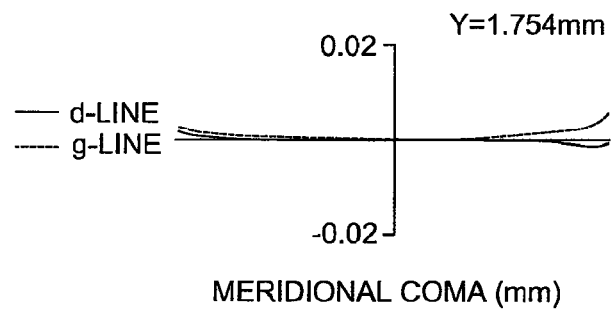

FIG. 26 shows a sectional view of the image pickup lens of Example 12. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 27 shows aberration diagrams (spherical aberration, astigmatism, distortion, and meridional coma) of the image pickup lens of Example 12.

Example 13

All the specifications of the image pickup lens of Example 13 are listed below.
f=5.07 mm
fB=0.3 mm
F=2.79
2Y=7.016 mm
ENTP=0.66 mm
EXTP=-3.09 mm
H1=-1.87 mm
H2=-4.78 mm Surface data of the image pickup lens of Example 13 are listed below.

| Surface number | r (mm) | d (mm) | Nd | vd | Effective radius (mm) |
|---|---|---|---|---|---|
| 1 | ∞ | 0.00 | | | 1.45 |
| 2* | 1.990 | 0.78 | 1.58910 | 61.3 | 1.17 |
| 3* | 22.611 | 0.06 | | | 0.87 |
| 4(Stop) | ∞ | 0.07 | | | 0.79 |
| 5* | 3.996 | 0.30 | 1.84670 | 23.8 | 0.82 |
| 6* | 2.114 | 0.52 | | | 0.87 |
| 7* | -5.328 | 0.75 | 1.54470 | 56.2 | 1.14 |
| 8* | -2.477 | 0.73 | | | 1.40 |
| 9* | -2.458 | 0.74 | 1.54470 | 56.2 | 1.80 |
| 10* | -1.318 | 0.45 | | | 2.10 |
| 11* | -3.805 | 0.47 | 1.54470 | 56.2 | 2.72 |
| 12 | 2.432 | 0.60 | | | 3.12 |
| 13 | ∞ | 0.30 | 1.51630 | 64.1 | 3.51 |
| 14 | ∞ | 3.59 | | | |

Aspheric surface coefficients are listed below.
Second Surface
 K=0.16048E+00, A4=0.44085E-03, A6=0.16448 E-02, A8=-0.13931E-02, A10=-0.66799E-03, A12=0.27957E-02, A14=-0.16437E-02
Third Surface
 K=-0.30000E+02, A4=-0.15140E-01, A6=0.38292E-01, A8=-0.40451E-01, A10=0.21525E-01, A12=-0.49219E-02, A14=-0.38410E-02
Fifth Surface
 K=-0.15084E+02, A4=-0.27916E-01, A6=0.58588E-01, A8=-0.66309E-01, A10=0.51360E-01, A12=-0.28248E-01, A14=-0.12346E-02
Sixth Surface
 K=-0.30864E+01, A4=0.55676E-03, A6=0.54032E-01, A8=-0.26718E-01, A10=0.91528E-02, A12=0.89625E-02, A14=-0.12265E-01
Seventh Surface
 K=0.18880E+02, A4=-0.28541E-01, A6=0.10280E-01, A8=-0.82048E-04, A10=0.81285E-02, A12=0.37207E-02, A14=0.30301E-02

Eighth Surface
K=0.91085E+00, A4=−0.23223E−01, A6=0.10704E−01, A8=−0.78952E−02, A10=0.32298E−02, A12=−0.41123E−03, A14=0.40575E−03

Ninth Surface
K=−0.10664E+00, A4=−0.46339E−01, A6=0.31462E−01, A8=−0.63701E−02, A10=−0.67015E−03, A12=0.84181E−03, A14=−0.14368E−03

Tenth Surface
K=−0.28588E+01, A4=−0.52964E−01, A6=0.18411E−01, A8=−0.19022E−02, A10=0.33631E−03, A12=−0.48093E−04, A14=−0.17968E−05

Single lens data of the image pickup lens of Example 13 are listed below.

| Lens | Forefront surface | Focal length (mm) |
| --- | --- | --- |
| 1 | 2 | 3.652 |
| 2 | 4 | −5.723 |
| 3 | 6 | 7.779 |
| 4 | 8 | 4.248 |
| 5 | 10 | −2.654 |

Values corresponding to the conditional expressions (1) to (6), and (8) to (10) of the image pickup lens of Example 13 are listed below.
(1) f12/f=1.33
(2) f2/f=−1.13
(3) r4/f=0.42
(4) v1−v2=37.5
(5) n2=1.847
(6) Pair23/P=−2.66
(8) |f3|/f=1.53
(9) d456/f=0.39
(10) L/2Y=0.85

In Example 13, each of the first and second lenses is formed of a molded glass lens, and each of the third through fifth lenses is formed of a plastic material.

Figure 28:
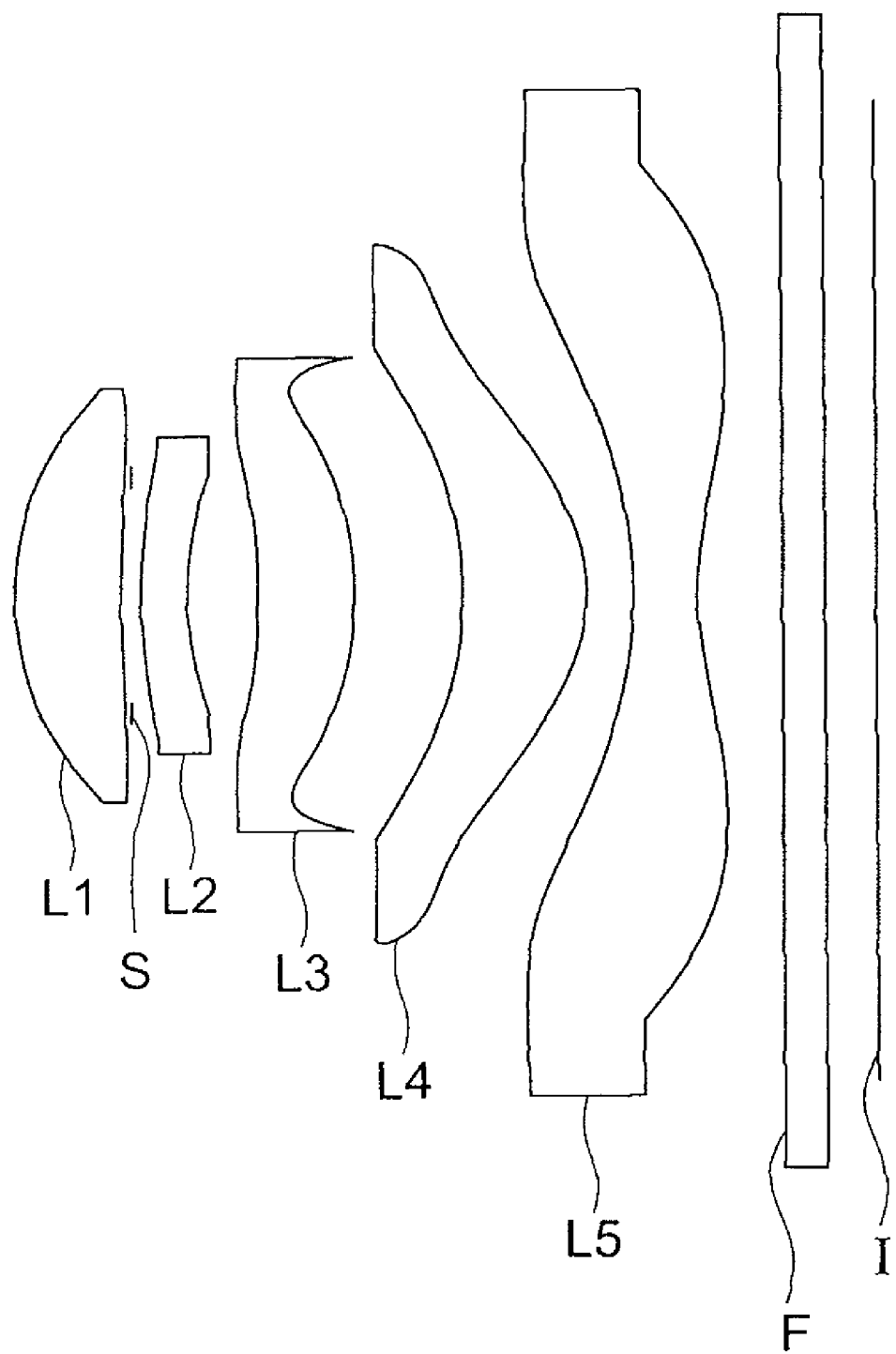
FIG. 28 shows a sectional view of the image pickup lens of Example 13.
Figure 29:
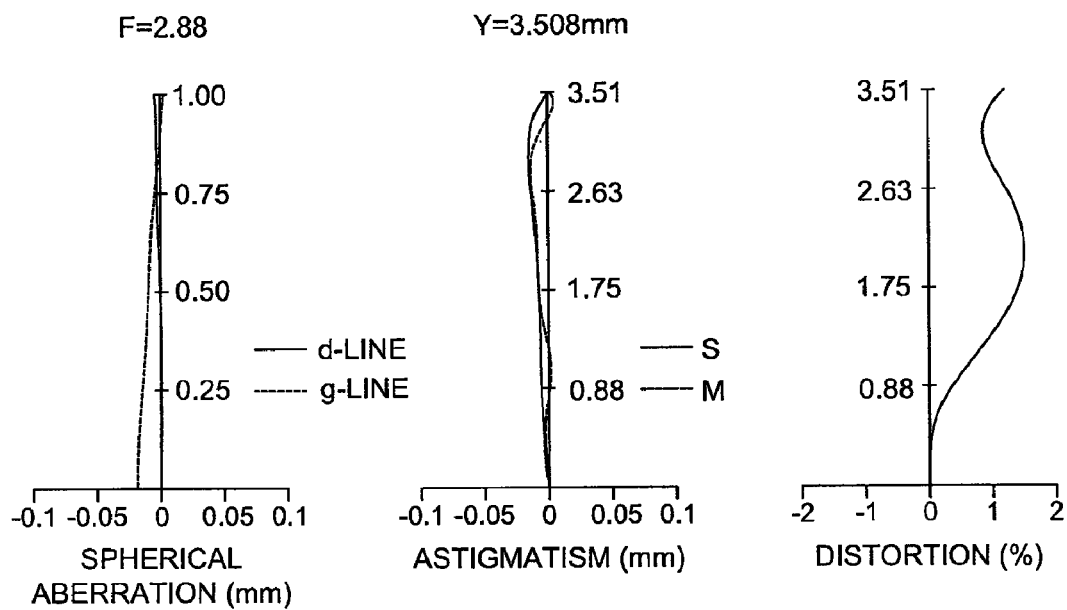
FIG. 29 shows aberration diagrams of the image pickup lens of Example 13 (spherical aberration, astigmatism, distortion, and meridional coma).
Figure 29:
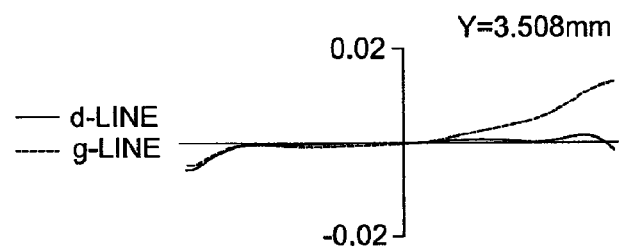
Figure 29:
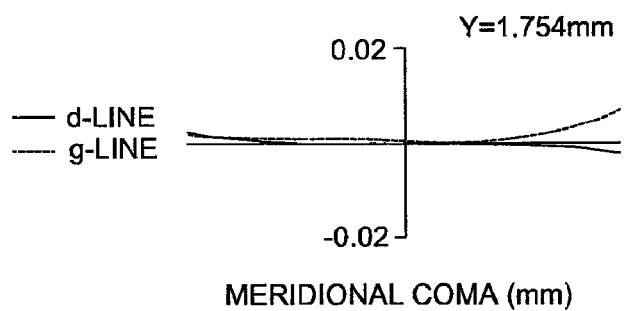

FIG. 28 shows a sectional view of the image pickup lens of Example 13. In the figure, L1 represents the first lens, L2 represents the second lens, L3 represents the third lens, L4 represents the fourth lens, L5 represents the fifth lens, S represents an aperture stop, and I represents an image pickup plane. Further, F represents a parallel flat plate provided on the assumption such as an optical low-pass filter, an infrared blocking filter, and a sealing glass of a solid-state image pickup element. FIG. 29 shows aberration diagrams (spherical aberration, astigmatism, distortion, and meridional coma) of the image pickup lens of Example 13.

In plastic materials, refractive-index change caused when temperature changes is large. Therefore, when each of the first through fifth lenses is formed of a plastic material, it causes a problem that a position of the image point of the total system of the image pickup lens fluctuates under the condition that the ambient temperature changes.

In recent years, it has been known that the change in a plastic material due to temperature can be made small by blending inorganic microparticles in a plastic material. The detailed explanation is described below. When microparticles are blended in a transparent plastic material, the plastic materials have been hardly used as optical materials because transmittance of the transparent plastic materials was lowered due to scattering of light, as generally known. However, it is possible not to cause the scattering substantially by reducing the size of microparticles to be smaller than a wavelength of a transmitting light flux. A plastic material has a refractive index decreasing when its temperature rises, while, inorganic particles have a refractive index increasing when its temperature rises. It is therefore possible that a change in refractive index hardly occurs by employing a plastic material and inorganic particles whose temperature dependencies work to cancel each other. Specifically, by dispersing inorganic particles whose largest side is 20 nm or less into a plastic material representing a base material, it is possible to realize a plastic material having a refractive index whose temperature dependency is extremely low. For example, by dispersing microparticles of niobium oxide ($Nb_2O_5$) into acrylic resin, the material can provide reduced change in the refractive index caused by temperature changes. In the above examples, by employing plastic materials in which the aforesaid inorganic particles are dispersed, for positive lens (L1) whose refractive power is relatively large or for all lenses (L1-L5), the fluctuation of the image point position caused by temperature changes in the total system of image pickup lens can be controlled to be small.

Incidentally, each of the above examples is not necessarily designed such that an incident angle of a principal ray of the light flux that enters an image pickup surface of a solid-state image pickup element is sufficiently small at a peripheral portion of the image pickup surface. However, in the recent technology, it has become possible to reduce shading by a revision of an arrangement of a color filter of a solid-state image pickup element and an onchip-microlens-array. Specifically, if a pitch of the arrangement of the color filter and the onchip-microlens-array is designed to be slightly smaller compared with a pixel pitch of the image pickup surface of the imaging device, a light flux of oblique incidence can be guided to an light-receiving section of each pixel efficiently, because the color filter and the onchip-microlens-array are shifted greater toward an optical axis of an image pickup lens at the position which is closer to a peripheral portion of the image pickup surface. Owing to this, shading generated on the solid-state image pickup element can be controlled to be small. The present examples provide design examples in which the above design requirement is lighten but further downsizing is aimed.

| REFERENCE SIGNS LIST | |
| --- | --- |
| 10 | Image pickup lens |
| 50 | Image pickup apparatus |
| 51 | Image pickup element |
| 52 | Substrate |
| 53 | Casing |
| 55 | Lens frame |
| 100 | Cell phone |
| L1 | First lens |
| L2 | Second lens |
| L3 | Third lens |
| L4 | Fourth lens |
| L5 | Fifth lens |
| S | Aperture stop |
| I | Image pickup plane |
| F | Parallel flat plate |

The invention claimed is:

1. An image pickup lens having a five-lens-element construction for forming an image of a subject onto a photoelectric conversion section of a solid-state image pickup element, the image pickup lens comprising, in order from an object side thereof:

a first lens with a positive refractive power, comprising a convex surface facing the object side;

a second lens with a negative refractive power, comprising a concave surface facing an image side, at least one surface of the second lens being aspheric;

a third lens having at least one aspheric surface;

a fourth lens with a positive refractive power, comprising a convex surface facing the image side; and a fifth lens with a negative refractive power, comprising a concave surface facing the image side, wherein the first to fifth lenses are separated from each other, wherein an image-side surface of the fourth lens is formed in an aspheric shape having positive refractive power which becomes smaller at a position on the surface, as the position becomes more distant from an optical axis of the fourth lens toward a peripheral portion, wherein an image-side surface of the fifth lens has an aspheric shape, and includes an inflection point at a position excluding an intersection point with an optical axis, and the image pickup lens satisfies the following conditional expressions:

$$20 < v1 - v2 < 70 \tag{4}$$

$$1.60 < n2 < 2.10 \tag{5}$$

$$L/2Y < 1.1 \tag{10}$$

where v1 is an Abbe number of the first lens, v2 is an Abbe number of the second lens, n2 is a refractive index of the second lens for d-line, L is a distance along the optical axis from the lens surface arranged at the closest position to the object side in a total system of the image pickup lens to the focal point at the image side, and 2Y represents a diagonal length of an image pickup surface of the solid-state image pickup element.

2. The image pickup lens of claim 1, satisfying the following conditional expression:

$$0.9 < f12/f < 2.0 \tag{1}$$

where f12 is a composite focal length of the first lens and the second lens, and f is a focal length of the total system of the image pickup lens.

3. The image pickup lens of claim 1, satisfying the following conditional expressions:

$$-2.5 < f2/f < -1.0 \tag{2}$$

$$0.3 < r4/f < 0.7 \tag{3}$$

where f2 is a focal length of the second lens, r4 is a curvature radius of an image-side surface of the second lens, f is a focal length of the total system of the image pickup lens.

4. The image pickup lens of claim 1 satisfying the following conditional expression:

$$-2.35 < Pair23/P < -0.75 \tag{6}$$

where P is a refractive power of the total system of the image pickup lens, and

Pair23 is a refractive power of an air lens formed by an image-side surface of the second lens and an object-side surface of the third lens, wherein the refractive power is a reciprocal of a focal length and the value of Pair23 is calculated by the following expression (7):

$$Pair23 = \{(1-n2)/r4\} + \{(n3-1)/r5\} - \{(1-n2) \cdot (n3-1) \cdot d23/(r4 \cdot r5)\} \tag{7}$$

where n2 is a refractive index of the second lens for d-line, n3 is a refractive index of the third lens for d-line, r4 is a curvature radius of the image-side surface of the second lens, r5 is a curvature radius of the object-side surface of the third lens, and d23 is an air distance along the optical axis between the second lens and the third lens.

5. The image pickup lens of claim 1 satisfying the following conditional expressions:

$$1.5 < |f3|/f < 20.0 \tag{8}$$

$$0.2 < d456/f < 0.4 \tag{9}$$

where f3 is a focal length of the third lens, d456 is a distance along the optical axis between an image-side surface of the second lens and an object-side surface of the fourth lens, and f is a focal length of the total system of the image pickup lens.

6. The image pickup lens of claim 1 wherein an object-side surface of the third lens is formed in an aspheric shape which curves to be closer to the second lens at a position on the surface, as the position advances toward a peripheral portion.

7. The image pickup lens of claim 1 wherein an image-side surface of the second lens is formed in an aspheric shape having negative refractive power which becomes smaller at a position on the surface, as the position becomes more distant from an optical axis toward a peripheral portion.

8. The image pickup lens of claim 1 wherein each of the first through fifth lenses is formed of a plastic material.

9. The image pickup lens of claim 1, wherein the second lens has a meniscus shape.

10. The image pickup lens of claim 1, wherein at least one surface of the first lens is aspheric.

11. An image pickup apparatus comprising:

a solid-state image pickup element for photo-electrically converting an image of a subject; and the image pickup lens of claim 1.

12. A mobile terminal comprising the image pickup apparatus of claim 11.

* * * * *